(12) United States Patent
Strano et al.

(10) Patent No.: US 9,315,406 B2
(45) Date of Patent: Apr. 19, 2016

(54) WASTEWATER TREATMENT SYSTEMS AND METHODS

(71) Applicant: ALCOA INC., Pittsburgh, PA (US)

(72) Inventors: Sarah K. Strano, Pittsburgh, PA (US); Shannon L. Isovitsch Parks, Sarver, PA (US); Jaw K. Fu, Murrysville, PA (US); John R. Smith, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 154 days.

(21) Appl. No.: 14/152,604

(22) Filed: Jan. 10, 2014

(65) Prior Publication Data

US 2014/0197096 A1    Jul. 17, 2014

Related U.S. Application Data

(60) Provisional application No. 61/751,524, filed on Jan. 11, 2013.

(51) Int. Cl.
| | |
|---|---|
| *C02F 3/32* | (2006.01) |
| *C02F 9/00* | (2006.01) |
| *C02F 3/28* | (2006.01) |
| *C02F 1/28* | (2006.01) |
| *C02F 1/42* | (2006.01) |

(Continued)

(52) U.S. Cl.
CPC . *C02F 9/00* (2013.01); *C02F 1/281* (2013.01); *C02F 1/42* (2013.01); *C02F 3/284* (2013.01); *C02F 3/2813* (2013.01); *C02F 3/327* (2013.01); *C02F 2101/20* (2013.01); *C02F 2101/308* (2013.01); *C02F 2101/32* (2013.01); *C02F 2103/003* (2013.01); *Y02W 10/12* (2015.05); *Y02W 10/18* (2015.05); *Y02W 10/37* (2015.05)

(58) Field of Classification Search
CPC .......... C02F 9/00; C02F 3/284; C02F 3/2813; C02F 1/281; C02F 1/42; C02F 3/327; C02F 2101/20; C02F 2101/308; C02F 2101/32; C02F 2103/003; Y02W 10/12; Y02W 10/18; Y02W 10/37
USPC .................................. 210/602, 603, 605, 614
See application file for complete search history.

(56) References Cited

U.S. PATENT DOCUMENTS

| | | |
|---|---|---|
| 515,895 A | 3/1894 | Bayer |
| 3,575,853 A | 4/1971 | Gaughan et al. |

(Continued)

FOREIGN PATENT DOCUMENTS

| | | |
|---|---|---|
| AU | 661703 | 8/1995 |
| AU | 200154015 | 1/2002 |

(Continued)

OTHER PUBLICATIONS

J. Pradhan et al., Adsorption of Phosphate from Aqueous Solution Using Activated Red Mud, Journal of Colloid and Interface Science, 1998, vol. 204, No. 1, pp. 169-172, Academic Press.

(Continued)

*Primary Examiner* — Fred Prince
(74) *Attorney, Agent, or Firm* — Greenberg Traurig, LLP

(57) ABSTRACT

The instant disclosure is directed towards methods of treating wastewater and related systems, where the system includes: a first zone comprising at least one anaerobic tank, and a second zone comprising at least one engineered wetland. In some embodiments, the system includes a third zone comprising at least one bauxite residue cell.

19 Claims, 18 Drawing Sheets

(51) Int. Cl.
  *C02F 101/20* (2006.01)
  *C02F 101/30* (2006.01)
  *C02F 101/32* (2006.01)
  *C02F 103/00* (2006.01)

(56) References Cited

U.S. PATENT DOCUMENTS

| | | | |
|---|---|---|---|
| 3,728,439 A | 4/1973 | Urban | |
| 3,764,652 A | 10/1973 | Morgan | |
| 3,770,623 A | 11/1973 | Seidel | |
| 3,922,224 A | 11/1975 | Lewandowski | |
| 4,108,770 A | 8/1978 | Roy | |
| 4,184,947 A | 1/1980 | Demisch | |
| 4,218,318 A | 8/1980 | Niimi et al. | |
| 4,267,038 A | 5/1981 | Thompson | |
| 4,270,875 A | 6/1981 | Kainuma | |
| 4,368,273 A | 1/1983 | Puskas | |
| 4,443,337 A | 4/1984 | Otani et al. | |
| 4,519,915 A | 5/1985 | George et al. | |
| 4,548,718 A | 10/1985 | Muir | |
| 4,555,992 A | 12/1985 | Dutu et al. | |
| 4,565,633 A | 1/1986 | Mayenkar | |
| 4,569,756 A | 2/1986 | Klein | |
| 4,591,443 A | 5/1986 | Brown et al. | |
| 4,668,485 A | 5/1987 | Cresswell et al. | |
| 4,678,582 A | 7/1987 | Lavigne | |
| 4,793,929 A | 12/1988 | Kickuth et al. | |
| 4,810,385 A | 3/1989 | Hater et al. | |
| 4,810,682 A | 3/1989 | Andrews | |
| 4,839,051 A | 6/1989 | Higa | |
| 4,855,040 A | 8/1989 | Kickuth | |
| 4,906,359 A | 3/1990 | Cox, Jr. | |
| 4,906,381 A | 3/1990 | Barbaro | |
| 4,952,315 A | 8/1990 | Saab | |
| 4,959,084 A | 9/1990 | Wolverton et al. | |
| 5,030,424 A | 7/1991 | Fulford et al. | |
| 5,078,882 A | 1/1992 | Northrop | |
| 5,087,353 A | 2/1992 | Todd et al. | |
| 5,091,315 A | 2/1992 | McCarty et al. | |
| 5,106,797 A | 4/1992 | Allaire | |
| 5,108,614 A | 4/1992 | Ross et al. | |
| 5,156,741 A | 10/1992 | Morrison et al. | |
| 5,160,632 A | 11/1992 | Kleefisch et al. | |
| 5,174,897 A | 12/1992 | Wengrzynek | |
| 5,200,081 A | 4/1993 | Stuth | |
| 5,227,068 A | 7/1993 | Runyon | |
| 5,266,213 A | 11/1993 | Gillham | |
| 5,271,848 A | 12/1993 | Smith et al. | |
| 5,273,653 A | 12/1993 | Kickuth | |
| 5,302,286 A | 4/1994 | Semprini et al. | |
| 5,314,629 A | 5/1994 | Griese et al. | |
| 5,318,699 A | 6/1994 | Robertson et al. | |
| 5,322,629 A | 6/1994 | Stewart | |
| 5,336,402 A | 8/1994 | Yamamoto et al. | |
| 5,337,516 A | 8/1994 | Hondulas | |
| 5,362,394 A | 11/1994 | Blowes et al. | |
| 5,368,411 A | 11/1994 | Losack | |
| 5,378,355 A | 1/1995 | Winkler | |
| 5,407,572 A | 4/1995 | McGuire et al. | |
| 5,411,665 A | 5/1995 | Scraggs et al. | |
| 5,415,770 A | 5/1995 | Heskett | |
| 5,451,325 A | 9/1995 | Herkenberg | |
| 5,456,553 A | 10/1995 | Li et al. | |
| 5,472,472 A | 12/1995 | Northrop | |
| 5,486,291 A | 1/1996 | Todd et al. | |
| 5,487,622 A | 1/1996 | Cherry et al. | |
| 5,518,618 A | 5/1996 | Mulder et al. | |
| 5,520,483 A | 5/1996 | Vigneri | |
| 5,527,453 A | 6/1996 | Hachima | |
| 5,534,154 A | 7/1996 | Gillham | |
| 5,549,817 A | 8/1996 | Horsley et al. | |
| 5,549,828 A | 8/1996 | Ehrlich | |
| 5,554,289 A | 9/1996 | Grounds | |
| 5,637,218 A | 6/1997 | Kickuth | |
| 5,690,827 A | 11/1997 | Simmering | |
| 5,702,593 A | 12/1997 | Horsley et al. | |
| 5,736,047 A | 4/1998 | Ngo | |
| 5,789,649 A | 8/1998 | Batchelor et al. | |
| 5,837,145 A | 11/1998 | Dzombak et al. | |
| 5,863,433 A | 1/1999 | Behrends | |
| 5,893,975 A * | 4/1999 | Eifert | 210/602 |
| 5,931,772 A | 8/1999 | Kirkpatrick et al. | |
| 5,975,798 A | 11/1999 | Liskowitz et al. | |
| 6,110,377 A | 8/2000 | Lamerant | |
| 6,132,623 A | 10/2000 | Nikolaidis et al. | |
| 6,159,371 A | 12/2000 | Dufay | |
| 6,200,469 B1 | 3/2001 | Wallace | |
| 6,207,114 B1 | 3/2001 | Quinn et al. | |
| 6,214,607 B1 | 4/2001 | Logan | |
| 6,242,663 B1 | 6/2001 | Ponder et al. | |
| 6,248,302 B1 | 6/2001 | Barnett et al. | |
| 6,277,274 B1 * | 8/2001 | Coffman | 210/150 |
| 6,280,614 B1 * | 8/2001 | Berg et al. | 210/170.08 |
| 6,387,276 B1 | 5/2002 | Nikolaidis et al. | |
| 6,399,359 B1 | 6/2002 | Hofstede | |
| 6,406,627 B1 | 6/2002 | Wallace | |
| 6,413,432 B1 | 7/2002 | Kumaoka | |
| 6,447,682 B1 | 9/2002 | Flowers | |
| 6,576,130 B2 | 6/2003 | Wallace | |
| 6,602,421 B2 | 8/2003 | Smith | |
| 6,652,743 B2 | 11/2003 | Wallace et al. | |
| 6,689,485 B2 | 2/2004 | Ponder et al. | |
| 6,719,902 B1 | 4/2004 | Alvarez et al. | |
| 6,730,215 B2 | 5/2004 | Shiota et al. | |
| 6,758,896 B2 | 7/2004 | Kunbargi | |
| 6,770,205 B1 | 8/2004 | Schroder et al. | |
| 6,942,807 B1 | 9/2005 | Meng et al. | |
| 7,008,964 B2 | 3/2006 | Clausen et al. | |
| 7,037,423 B2 | 5/2006 | Herman et al. | |
| 7,037,946 B1 | 5/2006 | Reinhart et al. | |
| 7,077,963 B2 | 7/2006 | McConchie et al. | |
| 7,128,839 B1 | 10/2006 | Flowers et al. | |
| 7,128,841 B2 | 10/2006 | Zhang | |
| 7,445,717 B2 | 11/2008 | Cha et al. | |
| 7,494,592 B2 | 2/2009 | Deskins | |
| 7,588,686 B2 | 9/2009 | Jensen | |
| 7,635,236 B2 | 12/2009 | Zhao et al. | |
| 7,718,062 B2 | 5/2010 | Bauer et al. | |
| 7,754,079 B2 | 7/2010 | Bauer | |
| 7,776,217 B2 * | 8/2010 | Lucas | 210/602 |
| 7,799,232 B2 | 9/2010 | Hayashi et al. | |
| 7,897,049 B2 | 3/2011 | Ghosh et al. | |
| 7,998,267 B2 | 8/2011 | Gartner et al. | |
| 8,002,984 B1 * | 8/2011 | Wanielista et al. | 210/602 |
| 8,048,303 B2 | 11/2011 | Lucas | |
| 8,114,279 B2 | 2/2012 | Jin et al. | |
| 8,157,995 B2 | 4/2012 | Ghosh et al. | |
| 8,206,586 B2 | 6/2012 | Smith et al. | |
| 8,523,997 B2 | 9/2013 | Valentini et al. | |
| 8,673,152 B2 | 3/2014 | Smith et al. | |
| 8,696,907 B2 | 4/2014 | Rausch et al. | |
| 2003/0089665 A1 | 5/2003 | Shaniuk | |
| 2003/0173306 A1 | 9/2003 | Cha et al. | |
| 2005/0153118 A1 | 7/2005 | Licata | |
| 2006/0021946 A1 | 2/2006 | Hensman et al. | |
| 2006/0144797 A1 | 7/2006 | McConchie et al. | |
| 2006/0230798 A1 | 10/2006 | McConchie et al. | |
| 2007/0131419 A1 | 6/2007 | Biscan et al. | |
| 2007/0181511 A1 * | 8/2007 | Smith et al. | 210/792 |
| 2007/0246419 A1 | 10/2007 | Milosavljevic | |
| 2008/0179253 A1 | 7/2008 | Clark et al. | |
| 2008/0209968 A1 | 9/2008 | Drew et al. | |
| 2008/0251448 A1 * | 10/2008 | Kent | 210/602 |
| 2008/0264301 A1 | 10/2008 | Porat et al. | |
| 2009/0065412 A1 | 3/2009 | Mbarki et al. | |
| 2010/0276360 A1 | 11/2010 | Smith et al. | |
| 2011/0219668 A1 | 9/2011 | Cramwinckel et al. | |
| 2011/0303609 A1 * | 12/2011 | Isovitsch Parks et al. | 210/663 |

(56) References Cited

U.S. PATENT DOCUMENTS

| | | |
|---|---|---|
| 2012/0160757 A1 | 6/2012 | Ghosh et al. |
| 2012/0223029 A1 | 9/2012 | Smith et al. |

FOREIGN PATENT DOCUMENTS

| | | |
|---|---|---|
| AU | 2009236126 | 10/2009 |
| CN | 101948214 | 1/2011 |
| EP | 863856 | 7/2004 |
| JP | 63264192 | 11/1988 |
| NZ | 516305 | 12/2001 |
| WO | 9728881 | 8/1997 |
| WO | 0177028 | 10/2001 |
| WO | 2007092914 | 8/2007 |
| WO | 2009000845 | 12/2008 |

OTHER PUBLICATIONS

W.R. Pinnock et al., Assessment of Strength Development in Bayer-Process Residues, Journal of Material Science, 1992, vol. 27, No. 2, pp. 692-696, Chapman and Hall.

R.N. Summers et al., Bauxite Reside (Red Mud) Increases Phosphorus Retention in Sandy Soil Catchments in Western Australia, Fertilizer Research, 1993, pp. 85-94, vol. 34, Kluwer Academic Publishers, the Netherlands.

Article, Camris, New Innovative Water Treatment Technology, date unavailable, 2 pp.

P. Vachon et al., Chemical and Biological Leaching of Aluminum from Red Mud, Environ. Sci. Technol., 1994, pp. 26-30, vol. 28, American Chemical Society.

I. Doye et al., Column Leaching Test to Evaluate the Beneficial Use of Alkaline Industrial Wastes to Mitigate Acid Mine Drainage, Tailings and Mine Waste 02, 2002, pp. 271-282, Swets & Zeitlinger.

L. Qiao et al., The Effects of Clay Amendment on Composting of Digested Sludge, Elsevier Science Ltd., 1997, pp. 1056-1064, vol. 31, No. 5, Wat. Res., Great Britain.

P. Kasliwal et al., Enrichment of Titanium Dioxide in Red Mud: A Kinetic Study, Hydrometallurgy, 1999, pp. 73-87, vol. 53, No. 1, Elsevier Science B.V.

D. McConchie et al., An Environmental Assessment of the Use of Seawater to Neutralise Bauxite Refinery Wastes, Second International Symposium on Extraction and Processing for the Treatment and Minimization of Wastes, 1996, pp. 407-416, The Minerals, Metals & Materials Society.

T. Mahata et al., Formation of Aluminum Titanate-Mullite Composite from Bauxite Red Mud, Metallurgical and Materials Transactions B, Jun. 2000, vol. 31B, No. 3, pp. 551-553.

E. Ercag et al., Furnace Smelting and Extractive Metallurgy of Red Mud: Recovery of TiO2, Al2O3 and Pig Iron, Journal of Chemical Technology and Biotechnology, 1997, pp. 241-246, vol. 70.

R. Apak et al., Heavy Metal Cation Retention by Unconventional Sorbents (Red Muds and Fly Ashes), Wat. Res., 1998, pp. 430-440, vol. 32, No. 2, Elsevier Science Ltd., Great Britain.

S.C. Ward et al., Modifying Sandy Soils with the Fine Residue from Bauxite Refining to Retain Phosphorus and Increase Plant Yield, Fertilizer Research, 1993, vol. 36, pp. 151-156, Kluwer Academic Publishers, the Netherlands.

S. Wang et al., Natural Zeolites as Effective Adsorbents in Water and Wastewater Treatment, Chemical Engineering Journal, 2010, pp. 11-24, vol. 156, Elsevier B.V.

S. Pilurzu et al., New Research Proposals for Utilisation and Disposal of Bauxitic Red Mud from Bayer Process, pp. 471-480.

S. Wang et al., Novel Applications of Red Mud as Coagulant, Adsorbent and Catalyst for Environmentally Benign Processes, Chemosphere, 2008, pp. 1621-1635, vol. 72, Elsevier Ltd.

M. Bowman, On-site Tertiary Treatment Using Ecomax Systems, Desalination, 1996, pp. 305-310, vol. 106, Elsevier Science B.V.

S.J. Shiao et al., Phosphate Removal from Aqueous Solution from Activated Red Mud, Journal WPCF, Feb. 1977, pp. 280-285.

B. Koumanova et al., Phosphate Removal from Aqueous Solutions Using Red Mud Wasted in Bauxite Bayer's Process, Resources, Conservation and Recycling, 1997, pp. 11-20, vol. 19, No. 1, Elsevier Science B.V.

B. Mishra et al., Pyrometallurgical Extraction of Alumina and Iron from Red Mud, The Minerals, Metals & Materials Society, EPD Congress, 2000, pp. 369-381.

G.I.D. Roach, Recovering Value from Bauxite Tailings, An International Bauxite Tailings Workshop, Nov. 2-6, 1992, pp. 409-418, The Australian Bauxite and Alumina Producers, Perth, Western Australia.

J. Kumpiene et al., Stabilization of As, Cr, Cu, Pb and Zn in Soil Using Amendments—A Review, Science Direct Waste Management, 2008, pp. 215-225, vol. 28, Elsevier Ltd.

G. Atun et al., A Study of Surface Properties of Red Mud by Potentiometric Method, Journal of Colloid and Interface Science, 2000, pp. 40-45, vol. 228, Academic Press.

L.R. Nissen et al., Synthetic Zeolites as Amendments for Sewage Sludge-Based Compost, Chemosphere, 2000, pp. 265-269, vol. 41, Elsevier Science Ltd.

C. Namasivayam et al., Treatment of Dairy-Waste Water Using Waste Red Mud, Research and Industry, Sep. 1992, vol. 37, No. 3, pp. 165-167.

D. McConchie et al., The Use of Seawater Neutralised Bauxite Refinery Residues (Red Mud) in Environmental Remediation Programs, REWAS'99: Global Symposium on Recycling, Waste Treatment and Clean Technology, 1999, pp. 391-400.

D. McConchie et al., The Use of Seawater-Neutralised Bauxite Refinery Residues in the Management of Acid Sulphate Soils, Sulphidic Mine Tailings and Acid Mine Drainage, Third Queensland Environmental Conference, May 25-26, 2000, pp. 201-208.

R. Phillips, Use of Soil Amendments to Reduce Nitrogen, Phosphorus and Heavy Metal Availability, Journal of Soil Contamination, 1998, pp. 191-211, vol. 7(2), AEHS.

P.J.A. Fowlie et al., Utilization of Industrial Wastes and Waste By-Products for Phosphorus Removal: An Inventory and Assessment, Environment Canada, Environmental Protection Service, Jun. 1973, pp. i-xii & 1-87, Project No. 72-3-5, Ontario Ministry of the Environment, Canada.

D. McConchie et al., The Use of Seawater Neutralised Red Mud from Bauxite Refineries to Control Acid Mine Drainage and Heavy Metal Leachates, 14th Australian Geological Convention, Jul. 1998, p. 298, Geological Society of Australia, Abstracts No. 49.

O.C. Fursman et al., Utilization of Red Mud Residues from Alumina Production, U.S. Department of the Interior, Bureau of Mines, Report of Investigations 7454, Nov. 1970, pp. 1-32.

E.E. Shannon et al., Utilization of Alumized Red Mud Solids for Phosphorus Removal, Journal WPCF, Aug. 1976, pp. 1948-1954, vol. 48, No. 8.

Website, http://www.walliswater.com.au, Retrieved from internet Mar. 20, 2012, 2 pp.

Website, http://www.aews.com.au/our-brands/wadi, Retrieved from internet Apr. 6, 2013, 2 pp.

Website, http://www.aews.com.au/our-brands/ecomax, Retrieved from internet Apr. 6, 2013, 4 pp.

Website, http://www.aews.com.au/our-brands/reo-drain, Retrieved from internet Apr. 6, 2013, 2 pp.

D. Austin, Advanced Treatment Wetlands: A 4th Generation Technology, North American Wetland Engineering, White Bear Lake, Minnesota, 7 pp.

S. Wallace et al., High Rate Ammonia Removal in Aerated Engineered Wetlands, Presented at the 10th International Conference on Wetland Systems for Water Pollution Control, Sep. 23-29, 2006, Lisbon, Portugal.

T.S. Jamieson et al., The Use of Aeration to Enhance Ammonia Nitrogen Removal in Constructed Wetlands, Canadian Biosystems Engineering, 2003, pp. 1.9-1.14, vol. 45, Department of Environmental Sciences and Department of Engineering, Nova Scotia Agricultural College, Nova Scotia, Canada.

S. Wallace et al., Design and Performance of the Wetland Treatment System at the Buffalo Niagara International Airport, Naturally Wallace Consulting, Vadnais Heights, Minnesota, 6 pp.

(56) References Cited

OTHER PUBLICATIONS

A. Kantardjieff et al., Practical Experiences with Aerobic Biofilters in TMP (Thermomechanical Pulping), Sulfite and Fine Paper Mills in Canada, Wat. Sci. Tech., 1997, pp. 227-234, vol. 35, Elsevier Science Ltd., Great Britain.

A.T. Mann et al., Modelling Biological Aerated Filters for Wastewater Treatment, Wat. Res., 1997, pp. 2443-2448, vol. 31, Elsevier Science Ltd., Great Britain.

Article "The Edmonton (Alberta) International Airport (EIA)", www.wef.org/magazine, Feb. 2011, p. 50, BCR Environmental.

R.H. Kadlec, Hydrologic Factors in Wetland Water Treatment, General Principles, Constructed Wetlands for Wastewater Treatment: Municipal, Industrial and Agricultural, Lewis Publishers, Chelsea, MI, pp. 21-40.

Ni-Bin Chang et al., New Performance Based Passive Septic Tank Underground Drainfield for Nutrient and Pathogen Removal Using Sorption Media, Environmental Engineering Science, 2010, pp. 469-482, vol. 27, copyright Mary Ann Liebert, Inc.

J.S. Han et al., Removal of Phosphorus Using Chemically Modified Lignocellulosic Materials, 6th Inter-Regional Conference on Environment-Water "Land and Water Use Planning and Management", Sep. 3-5, 2003, pp. 1-11, Albacete, Spain.

G. Roberge et al., Enlevement du phosphore des eaux usées par traitement à base de tourbe dopée aux boues rouges, The Canadian Journal of Chemical Engineering, Dec. 1999, pp. 1185-1194, vol. 77, Canada.

Goen E. Ho et al., Groundwater Recharge of Sewage Effluent Through Amended Sand, Wat. Res., 1992, pp. 285-293, vol. 26, No. 3, Pergamon Press, Great Britain.

International Search Report and Written Opinion of the International Searching Authority dated Jan. 23, 2008 from International Application No. PCT/US2007/061821.

Goen E. Ho et al., Nitrogen and Phosphorus Removal from Sewage Effluent in Amended Sand Columns, Wat. Res., 1992, pp. 295-300, vol. 26, No. 3, Pergamon Press plc, Great Britain.

Yuansheng Hu et al., High Rate Nitrogen Removal in an Alum Sludge-Based Intermittent Aeration Constructed Wetland, Environmental Science & Technology, Jan. 31, 2012, pp. 1-34, ACS Paragon Plus Environment, Dublin, Ireland.

D.A. Kopec, Small Subsurface Flow Constructed Wetlands with Soil Dispersal System, Permit to Install 3 Final, Nov. 5, 2007, pp. 1-23, Ohio EPA, Division of Surface Water.

Draft Demo ESTCP, Tertiary Treatment and Recycling of Waste Water Environmental Restoration, Technology Demonstration Plan, Jan. 2011, pp. i-v & 6-41, United States Department of Defense ESTCP.

C. Klauber, Review of Bauxite Residue "Re-use" Options, CSIRO National Research Flagships Light Metals, May 2009, pp. i-viii & 1-66, Department of Resources, Energy and Tourism (DRET), Australia.

T. Bagshaw, Alumina Technology Roadmap, International Aluminium Institute Bauxite and Alumina Committee 2010 Update, 2011, pp. 1-24, International Aluminium Institute.

Website, http://virotec.com/solutions/industrial-wastewater-solids-treatment/, Retrieved from the internet on Feb. 7, 2013, 3 pp.

Sun et al., Treatment of Groundwater Polluted by Arsenic Compounds by Zero Valent Iron, Journal of Hazardous Materials, vol. 129, No. 1-3, Feb. 28, 2006 pp. 297-303.

S. Beveridge, $1.5 Billion in Reclamation Fund Untapped Despite Growing List of Abandoned Mines, Washington Observer-Reporter, pp. 1-3 (Sep. 23, 2002).

Ray et al., Treatment of Urban Stormwater for Dissolved Pollutants: A Comparative Study of Natural Organic Filter Media, Wiley Interscience, Autumn 2005, Wiley Periodicals, Inc., pp. 89-100, US government.

H.T. Hofstede, Use of Bauxite Refining Residue to Reduce the Mobility of Heavy Metals in Municipal Waste Compost, Doctoral Thesis presented by Henricus Theodorus Hofstede, Jan. 1994, School of Biological and Environmental Sciences, Murdoch University, Australia, 281 pages.

J.C. Novoa-Munoz et al., Changes in Soil Properties and in the Growth of Lolium Multiforum in an Acid Soil Amended with a Solid Waste from Wineries, Bioresource Technology 99 (2008), pp. 6771-6779.

Remy Albrecht et al., Changes in the Level of Alkaline and Acid Phosphatase Activities During Green Wastes and Sewage Sludge Co-composting, Bioresource Technology 101 (2010), pp. 228-233.

Jenn-Hung Hsu et al., Chemical and Spectroscopic Analysis of Organic Matter Transformations during Composting of Pig Manure, Environmental Pollution 104 (1999), pp. 189-196.

Susan Tandy et al., Remediation of Metal Polluted Mine Soil with Compost: Co-composting Versus Incorporation, Environmental Pollution 157 (2009) 690-697.

Meeussen et al., Dissolution Behavior of Iron Cyanide (Prussian Blue) in Contaminated Soils, Environ. Sci. Technol., 1992, pp. 1832-1838, vol. 26, No. 9, American Chemical Society.

Bauxite Geology, http://www.world-aluminum.org/production/mining/geology/html, 2 pp., retrieved from internet on Apr. 24, 2008.

S. Beveridge, Coal Mines Fuel PA Pollution Crisis, Washington Observer-Reporter, Sep. 23, 2002.

S. Beveridge, DEP Creates Fund to Treat Drainage at Closed LTV Sites, Washington Observer-Reporter, Sep. 3, 2002.

S. Beveridge, DEP Orders Beth Energy Mines to Continue Water Cleanup, Washington Observer-Reporter, Nov. 26, 2002.

S. Beveridge, Study Predicts Old Mine Water Likely to Pollute Mon River Soon, Washington Observer-Reporter, Nov. 24, 2002, 1 page.

Cooper et al., An Investigation of Radionuclide Uptake into Food Crops Grown in Soils Treated with Bauxite Mining Residues, Journal of Radioanalytical and Nuclear Chemistry, vol. 194, No. 2, pp. 379-387 (1995).

Woodwell, Meeting on Monongahela Mine Pools, Alcoa Corporate Office, Pittsburgh, PA, Jan. 2, 2003, 1 page.

Article, Montana Mining Firms to Begin Huge Berkeley Pit Cleanup, Civil Engineering News, Jun. 2002, 2 pp.

J. Skousen, What is Acid Mine Drainage, WVU College of Agriculture and Forestry, Division of Plant and Soil Science, 1 page.

Article, Recycling and Reuse of Basic Oxygen Furnace (BOF)/Basic Operation Process (BOP) Steelmaking Slags, Steel Project Fact Sheet, Office of Industrial Technologies, Energy Efficiency and Renewable Energy, US Department of Energy, 1 page.

Skousen et al., Overview of Acid Mine Drainage Treatment with Chemicals, Center for Agriculture, Natural Resources and Community Development, West Virginia University Extension Services, http://www.wvu.edu/~agexten/landrec/chemtrt.htm, 15 pp.

US Filter et al., Final Design Report—Horseshoe Bend Water Treatment Facility, Appendix B, Treatability Studies Associated with the Horseshoe Bend Water Treatment Facility, Dec. 2001, 46 pp.

Wong et al., Cation Exchange Behavior of Bauxite Refining Residues from Western Australia, Journal of Environmental Quality, vol. 24, No. 3, pp. 461-466 (1995).

Ziemkiewicz et al., Abandoned Mine Pool Flooding of the Pittsburgh, Ohio, and Irwin Basins, submitted to Parsons Infrastructure & Technology Group, Inc., National Mine Land Reclamation Center, WV173 Phase II, Feb. 2002, 4 pp.

R. Apak et al., Sorptive Removal of Cesium-137 and Strontium-90 from Water by Unconventional Sorbents, Journal of Nuclear Science and Technology, 1995, 32(10), 1008-1017.

G.I.D. Roach et al., Zeolite Production from DSP in Red Mud Feedstock, Light Metals 1993, 51-57.

J. Skousen et al., Effect of Digestion Method, Siderite Content, and Fizz Rating on Neutralization Potential of Overburden Samples, Center for Agriculture, Natural Resources & Community Development, West Virginia University, Extension Service, http://www.wvu.edu/~agexten/landrec/nppapjeq.htm, downloaded from the Internet on Apr. 9, 2013, 17 pp.

Ghosh et al., Equilibrium Precipitation and Dissolution of Iron Cyanide Solids in Water, Environmental Engineering Science, 1999, pp. 293-314, vol. 16, No. 4.

Dollhopf, Suitability of Bauxite Residue for Neutralization of Acid Producing Mine Wastes, pp. 1-16, Montana State University Reclamation Research Unit for Aluminum Company of America.

http://libertyhydro.net/treatment-systems/selenium-treatment/, retrieved from internet on Jul. 11, 2011.

(56) References Cited

OTHER PUBLICATIONS

Article, Liberty Hydro, Selenium Remediation Using Zero Valent Iron, date unavailable, 2 pp.
J. Fu et al., Adsorption of Disperse Blue 2BLN by Microwave Activated Red Mud, Environmental Progress and Sustainable Energy, Dec. 2011, vol. 30, No. 4, pp. 558-566.
Ramaswami et al., Batch-Mixed Iron Treatment of High Arsenic Waters, Water Research 35(18): 4474-4479, 2001.
Bang et al., Chemical Reactions Between Arsenic and Zero Valent Iron in Water, Water Research 39(5): 763-770, 2005.
Lu et al., Dechlorination of Hexachlorobenzene by Zero-Valent Iron, Pract. Periodical of Haz., Toxic, and Radioactive Waste Mgmt., vol. 8, Issue 2, Apr. 2004, pp. 136-140 (Abstract only).
Gavaskar et al., Design Guidance for Application of Permeable Barriers to Remediate Dissolved Chlorinated Solvents, Feb. 1997, pp. 1-192.
Greenway et al., Media Amendments for Enhancing Phosphorous Retention in Intermittently Loaded Vertical Flow Wetlands, Griffith University, Brisbane, Australia, Nov. 2012.
Article, University of Cape Town, South Africa Presentation on pe-PH Diagrams, retrieved from http://web.uct.ac/za/depts/geolsci/roy/lectures/lec10.pdf in May 2006, pp. 1-15.
Durant et al., Remediation of Perchlorate, NDMA, and Chlorinated Solvents Using Nanoscale ZVI, RTDF PRB Workshop Niagara Falls, New York, Oct. 16, 2003, pp. 1-31.
Zhang et al., Removal of Selenate from Water by Zerovalent Iron, J. Environ. Qual. 34, pp. 487-495, 2005 (abstract only), http://jeq.scijournals.org/cgi/content/abstract/34/2/487.
R.S. Ghosh, State of SERDP/ESTCP Funded Zero Valent Iron (ZVI) Research and Technology, SERDP, 21 pp., retrieved from the Internet Apr. 2, 2008 at http:///www.frtr.gov/pdf/meetings/k--ghosh_09jun04.pdf.
International Search Report and Written Opinion of the International Searching Authority dated Aug. 24, 2011 from International Application No. PCT/US2011/040300.
E. Lopez et al., Adsorbent Properties of Red Mud and Its Use for Wastewater Treatment, Wat. Res., 1998, pp. 1314-1322, vol. 32, No. 4, Elsevier Science Ltd., Great Britain.
J. Pradhan et al., Adsorption of Hexavalent Chromium from Aqueous Solution by Using Activated Red Mud, Journal of Colloid and Interface Science, 1999, vol. 217, No. 1, pp. 137-141, Academic Press.
Robert H.L. Howe, "Recent Advance in Cyanide Waste Reduction Practice", 18th Industrial Waste Conference, pp. 690-705, Purdue University, 1963.
International Preliminary Report on Patentability dated Aug. 12, 2008 from International Application No. PCT/US2007/061821.
Communication Relating to the Results of the Partial International Search from International Application No. PCT/US2007/061821.
U.S. Environmental Protection Agency, Office of Research and Development, Center for Environmental Research Information, Cincinnati, OH 45268, Design Manual, Constructed Wetlands and Aquatic Plant Systems for Municipal Wastewater Treatment, EPA/625/1-88-022, Sep. 1988, 92 pp.
Barbieri, J.M., et al., Paris Improves Its Drinking Water Treatment Plants, Journal of the Institution of Water & Environmental Management, pp. 2-12.
Panswad, Thongchai, et al., Water Quality and Occurrences of Protozoa and Metazoa in Two Constructed Wetlands Treating Different Wastewaters in Thailand, Water Science & Technology, pp. 183-188, 1997, vol. 36, No. 12.
Anonymous, Tertiary Filtration of Wastewaters, Journal of Environmental Engineering, Dec. 1986, pp. 1008-1026, vol. 112, No. 6.
Reddy, K.R., et al., State-of-the-Art Utilization of Aquatic Plans in Water Pollution Control, Water Science & Technology, 1987, vol. 19, No. 10, 19 pp.
Zachritz, Walter H., II, et al., Performance of an Artificial Wetlands Filter Treating Faculative Lagoon Effluent at Carville, Louisiana, Water Environment Research, pp. 46-52, Jan.-Feb. 1993, vol. 65, No. 1.

Tyre, Bryan W., et al., On-Site Sewage Disposal for a Subdivision in a High Groundwater Area, Proceedings of the 1997 Symposium on-Site Characterization and Design of On-Site Septic Systems, pp. 283-293, Nov. 1997, vol. 1324, ASTM, Conshohocken, PA.
Stockdale, Erik C., et al., Prospects for Wetlands Use in Stormwater Management, Coastal Zone 87, Proceedings of the Fifth Symposium on Coastal and Ocean Management, pp. 3701-3714, vol. 4, ASCE, New York, N.Y.
W.C. Lucas, Design of Integrated Bioinfiltration-Detention Urban Retrofits with Design Storm and Continuous Simulation Methods, Journal of Hydrologic Engineering, vol. 15, No. 6, Jun. 1, 2010, pp. 486-498.
W.C. Lucas et al., Hydraulic Response and Nitrogen Retention in Bioretention Mesocosms with Regulated Outlets: Part I—Hydraulic Response, Water Environment Research, Aug. 2011, vol. 83, No. 8, pp. 692-702.
W.C. Lucas et al., Hydraulic Response and Nitrogen Retention in Bioretention Mesocosms with Regulated Outlets: Part II—Nitrogen Retention, Water Environment Research, Aug. 2011, vol. 83, No. 8, pp. 703-713.
W.C. Lucas et al., Phosphorus Retention by Bioretention Mesocosms Using Media Formulated for Phosphorus Sorption: Response to Accelerated Loads, Journal of Irrigation and Drainage Engineering, Mar. 1, 2011, vol. 137, No. 3, pp. 144-153.
Virotec, Treatment of Pesticide Contaminated Wastewater and Soil, Technical Report, Virotec Global Solutions, 9 pp.
Virotec, Treating Contaminated Stormwater Using ViroflowTM Technology, Technical Paper, Virotec Global Solutions, 18 pp.
Westerhoff, Paul, "Removal of Endocrine Disruptors, Pharmaceuticals, and Personal Care Products During Water Treatment", Southwest Hydrology, Nov./Dec. 2003, pp. 18-19.
International Search Report and the Written Opinion of the International Searching Authority dated Oct. 30, 2007 from International Application No. PCT/US2007/069016.
W. Huang et al., Phosphate Removal from Wastewater Using Red Mud, Journal of Hazardous Materials, 158, 2008, Elsevier B.V., pp. 35-42.
Goen Ho et al., Phosphorus Removal Using Bauxite Refining Residue (Red Mud), Institute for Environmental Science, Murdoch University, Perth, Western Australia, Technical Papers, Apr. 18-23, 1993, vol. 3, pp. 607-613.
K. Mathew et al., Small Scale Treatment Systems, Environmental Science, Murdoch University, Murdoch, Western Australia, Aug. 1993, pp. 149-159.
D.M. Weaver et al., The Effectiveness of Lime-based Amendments and Bauxite Residues at Removing Phosphorus from Piggery Effluent, Environmental Pollution, vol. 46, Issue 3, 1987, pp. 163-175.
G. Ho et al., Bacteria and Virus Removal from Secondary Effluent in Sand and Red Mud Columns, Water Science & Technology, vol. 23 (1-3), 1991, pp. 261-270.
Anonymous, Microstrainers Aid Pollution Control, European Water & Sewage, vol. 90, No. 1088, Oct. 1986, pp. 440, 442-443.
F. Rojo, Minireview, Degradation of Alkanes by Bacteria, Environmental Microbiology, 11 (10), 2009, pp. 2477-2490.
B. Gargouri et al., Application of a Continuously Stirred Tank Bioreactor (CSTR) for Bioremediation of Hydrocarbon-Rich Industrial Wastewater Effluents, Journal of Hazardous Materials, 189, 2011, pp. 427-434.
P.G. Nix et al., A Constructed Wetland for the Treatment of Stormwater Contaminated with Diesel Fuel, Proceedings, 17th Arctic and Marine Oilspill Program Technical Seminar, 1994, vol. 17, pp. 439-464.
R. Bartha, Biotechnology of Petroleum Pollutant Biodegradation, Microbial Ecology, 1986, vol. 12, pp. 155-172.
F. Widdel, Cultivation of Anaerobic Microorganisms with Hydrocarbons as Growth Substrates, K. N. Timmis (ed.), Handbook and Lipid Microbiology, Springer-Verlag Berlin Heidelberg, 2010, pp. 3787-3798.
R.J. Watkinson et al., Physiology of Aliphatic Hydrocarbon-Degrading Microorganisms, Biodegradation, 1990, 1, pp. 79-92.
R.A. Patterson et al., Temporal Variability of Septic Tank Effluent in Future Directions for On-site Systems: Best Management Practice. Proceedings of On-site '03 Conference. Held at University of New

(56) References Cited

OTHER PUBLICATIONS

England, Armidale, 30th Sep. to Oct. 2, 2003. Published by Lanfax Laboratories Armidale, pp. 305-312.

M.A. Gomez et al., Influence of Carbon Source on Nitrate Removal of Contaminated Groundwater in a Denitrifying Submerged Filter, Journal of Hazardous Materials, 2000, B80, pp. 69-80.

G. Maltais-Landry et al., Nitrogen Transformations and Retention in Planted and Artificially Aerated Contructed Wetlands, Water Research 43, 2009, pp. 535-545.

W.D. Robertson et al., Wood-Based Filter for Nitrate Removal in Septic System, Transactions of the ASABE, vol. 48, pp. 121-128.

B.B. Storey et al., Water Quality Characteristics and Performance of Compost Filter Berms, Texas Department of Transportation, 2004, 119 pp.

U.S. Environmental Protection Agency, Wastewater Technology Fact Sheet Wetlands: Subsurface Flow, Sep. 2000, 9 pp.

U.S. Environmental Protection Agency, Wastewater Management Fact Sheet: Denitrifying Filters, Sep. 2007, 7 pp.

Z. Yousefi et al., Nitrogen and Phosphorus Removal from Wastewater by Subsurface Wetlands Planted with Iris pseudacorus, Ecological Engineering, 36, 2010, pp. 777-782.

K. Abe et al., Efficiency of Removal of Nitrogen, Phosphorus, and Zinc From Domestic Wastewater by a Constructed Wetland System in Rural Areas: A Case Study, Water Science & Technology, 2008, pp. 2427-2433.

A.N. Bezbaruah et al., Incorporation of Oxygen Contribution by Plant Roots into Classical Dissolved Oxygen Deficit Model for a Subsurface Flow Wetland, Water Science & Technology, 2009, pp. 1179-1184.

P. Champagne, Wetlands, Natural Processes and Systems for Hazardous Waste Treatment, Environmental and Water Resources Institute (EWRI) of the American Society of Civil Engineers, 2008, pp. 189-256.

M. Healy et al., Nutrient Processing Capacity of a Constructed Wetland in Western Ireland, Journal of Environmental Quality, vol. 31, Sep.-Oct. 2002, pp. 1739-1747.

P. Kuschk et al., Annual Cycle of Nitrogen Removal by a Pilot-Scale Subsurface Horizontal Flow in a Constructed Wetland Under Moderate Climate, Water Research, 2003, pp. 4236-4242.

N. Tam et al., Mass Balance of Nitrogen in Constructed Mangrove Wetlands Receiving Ammonium-Rich Wastewater: Effects of Tidal Regime and Carbon Supply, 2009, Ecological Engineering, pp. 453-462.

J. Vymazal, Constructed Wetlands for Wastewater Treatment: Five Decades of Experience, Environmental Science & Technology, 2011 vol. 45, No. 1, pp. 61-69.

C.S. Lee, Thesis: Biodegradation of Oil and Grease in Upflow Anaerobic Sludge Blanket Reactor for Palm Oil Mill Effluent Treatment, Universiti Teknologi Malaysia (UTM), 2006.

D. Couillard, Dephosphatation Des Eaux a L'Aide de Dechets Provenant des Industries de la Reduction de L'Aluminium, Eau du Quebec, vol. 16, No. 1, Feb. 1983, pp. 34-37.

Dod, Water Conservation: Tertiary Treatment and Recycling of Waste Water, (ER-201020), Fact Sheet, Jan. 2011, 2 pp.

K.M. Foxon et al., The evaluation of the Anaerobic Baffled Reactor for Sanitation in Dense Peri-Urban Settlements, Report to the Water Research Commission, WRC Report No. 1248/01/06, Feb. 2006.

R.L. Knight et al., The Use of Treatment Wetlands for Petroleum Industry Effluents, Environmental Science & Technology, vol. 33, No. 7, 1999, pp. 973-980.

* cited by examiner

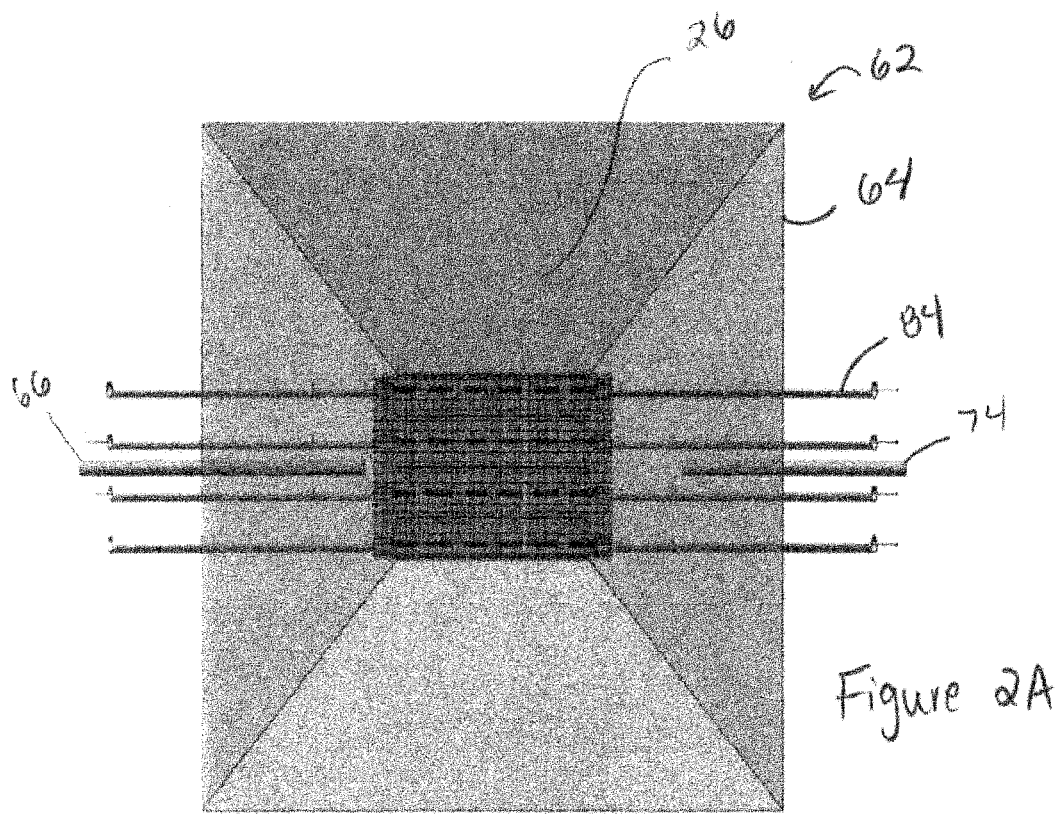
Figure 2A
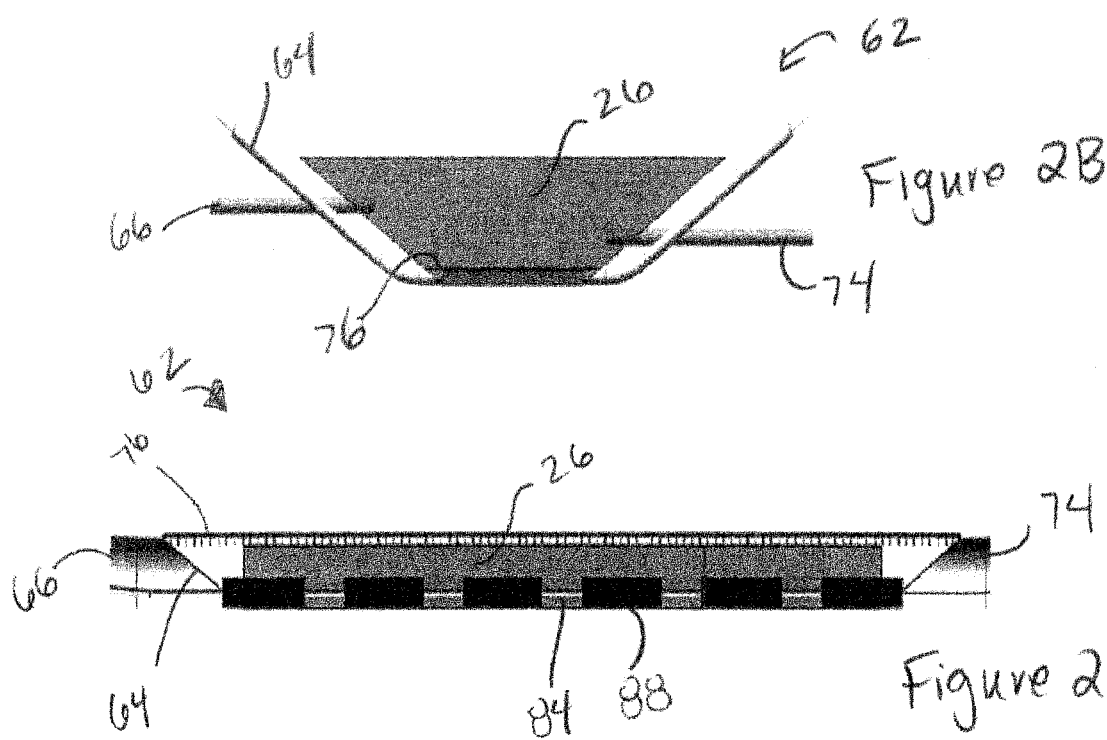
Figure 2B
Figure 2C

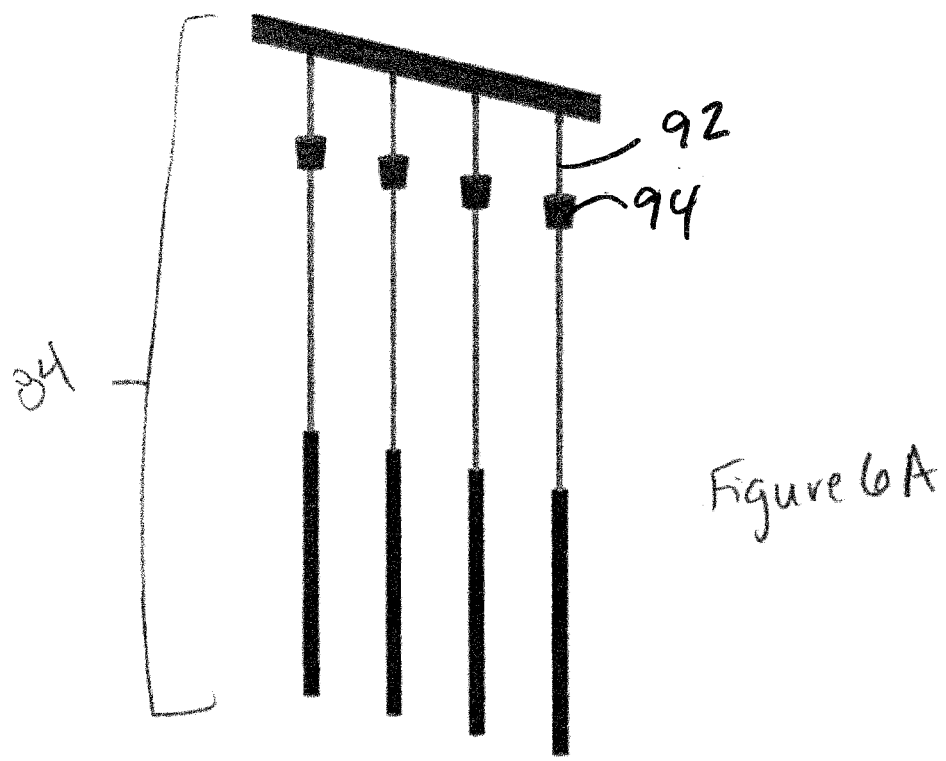
Figure 6A
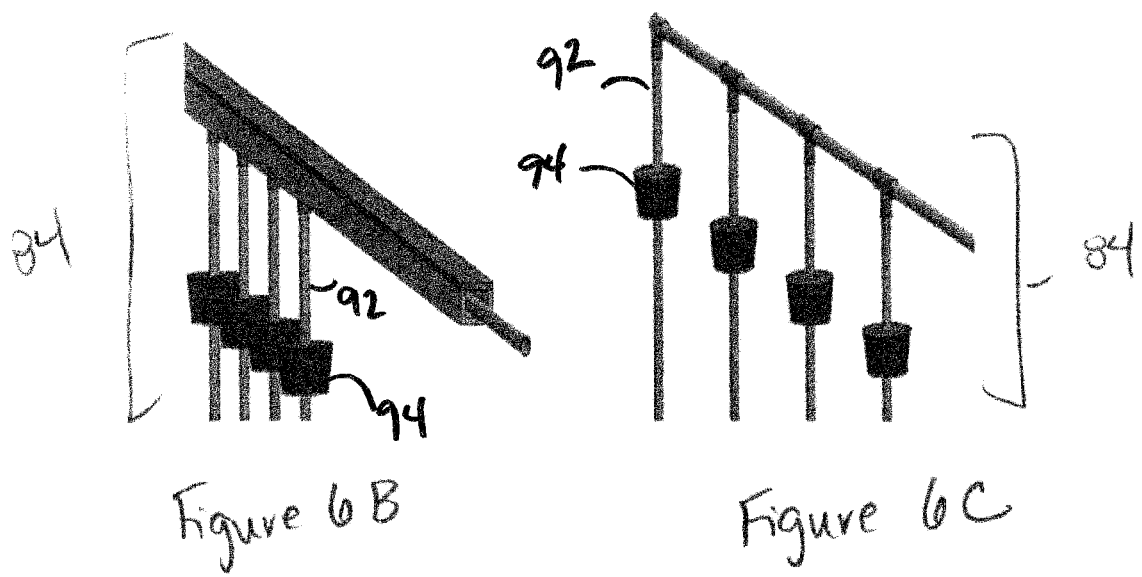
Figure 6B
Figure 6C

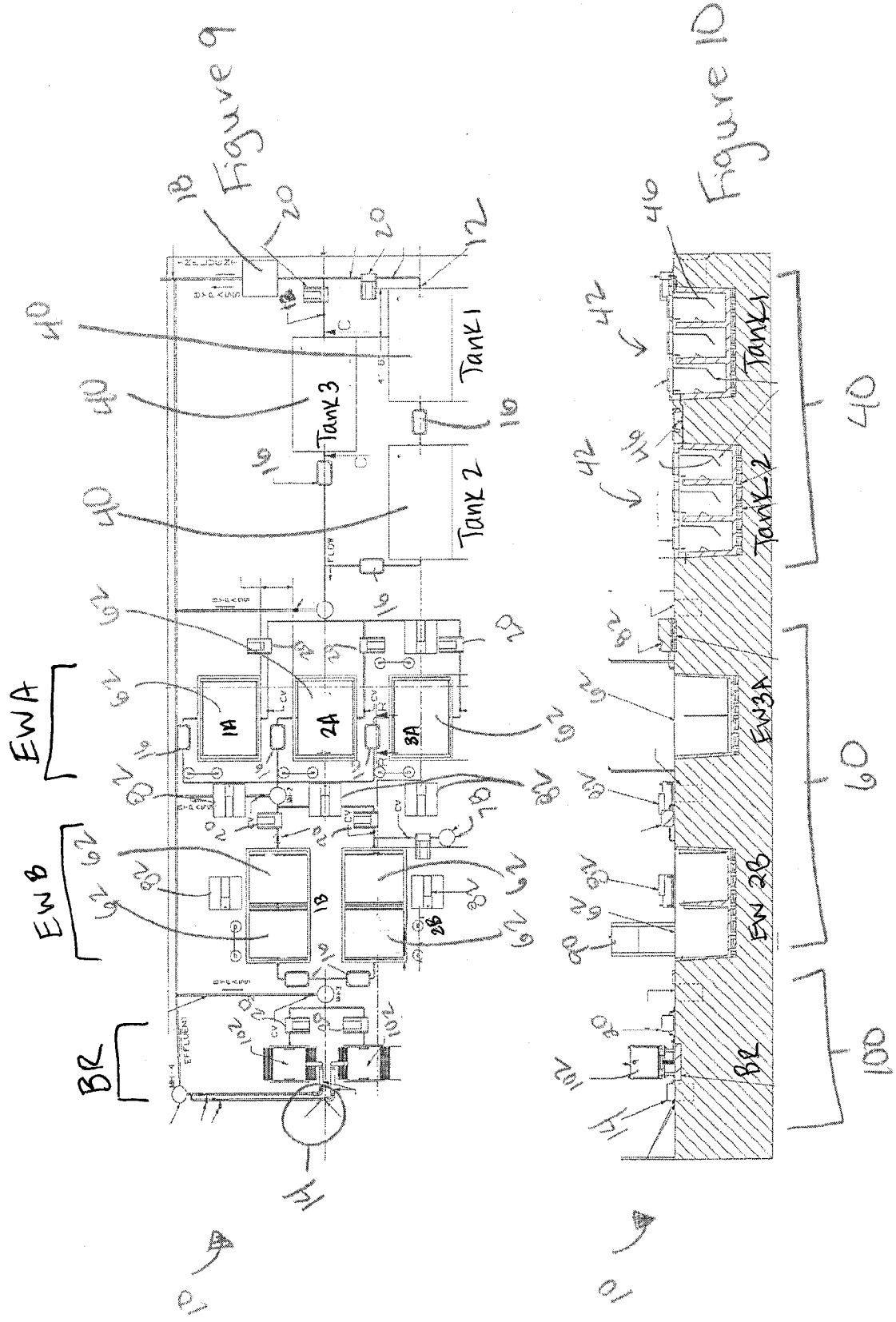

|  | Porosity | EBCT (min) | HRT (hr) |
|---|---|---|---|
| 1. Sand (Control) | 0.41 | 624 | 4.25 |
| 2. BR Only | 0.39 | 624 | 4.01 |
| 3a. Compost+ZVI | 0.49 | 624 | 5.10 |
| 3b. Sand+ZVI | 0.42 | 624 | 4.40 |
| 4. BR+ZVI | No data | 624 | No data |
| 5a. Compost+ZVI | 0.49 | 624 | 5.10 |
| 5b. BR+ZVI | 0.37 | 624 | 3.80 |

WASTEWATER TREATMENT SYSTEMS AND METHODS

CROSS-REFERENCE TO RELATED APPLICATIONS

This application claims priority to U.S. Application Ser. No. 61/751,524, entitled "Wastewater Treatment System and Methods" filed on Jan. 11, 2013, which is incorporated by reference in its entirety.

FIELD OF THE INVENTION

Generally, the instant disclosure is directed towards a wastewater treatment system for removing contaminants, organics, inorganics, metals, pathogens, particulates, pharmaceuticals, nutrients, and/or personal care products from wastewater to a quality suitable for permitted discharge, recycle, and/or reuse. More specifically, the instant disclosure is directed towards a system including three zones for wastewater treatment, including an anaerobic settling/treatment tank, an engineered wetland, and a bed of metal oxide type media (e.g. bauxite residue).

BACKGROUND

Prior to discharge into the environment or recycle for beneficial use, wastewater must generally be within certain prescribed limits for various contaminant levels. Conventional wastewater treatment systems may be onerous, costly, time consuming, and require a high amount of energy to run and operate the system.

SUMMARY OF THE DISCLOSURE

Broadly, the present disclosure relates to systems and methods for treating wastewater. More specifically, the instant disclosure is directed towards removing organic material, suspended solids, particulates, metals, emulsified oils and grease, pharmaceuticals, nutrients, personal care products, pathogens, bacteria, microorganisms, and viruses from a wastewater stream via a wastewater system having three zones, including: a first zone comprising at least one anaerobic settling/treatment tank; a second zone comprising at least one engineered wetland configured for aeration (e.g. varying degrees of aeration); and a third zone comprising at least one cell having a metal oxide type media therein (e.g. bauxite residue; BR/ZVI; and other media in conjunction with bauxite residue).

Without being bound to a particular mechanism or theory, it is believed that the combination of these three zones (and/or components) is combinable to yield a wastewater treatment system which removes a contaminated wastewater stream having various classes/types of contaminants to below legal limits and/or to a quality suitable for reuse/recycle.

Without being bound to a particular mechanism or theory, it is believed that as the first zone removes a large portion of BOD/COD/TOC from the wastewater treatment stream, the engineered wetland is specifically configured to focus on nitrogen removal, pathogen removal (e.g. as indicated by fecal coliform or *E. coli*), BOD/COD (e.g. up to an additional 10%, or up to the remaining BOD/COD) and/or remaining suspended solids.

In one aspect, a wastewater treatment system is provided, comprising: at least one anaerobic settling/treatment tank, wherein the tank comprises a plurality of baffles (e.g. horizontally and or vertically) spaced along the length thereof, wherein the primary settling tank configured to receive wastewater and remove solid particulates therefrom; an engineered wetland, in liquid communication with the settling/treatment tank, wherein the engineered wetland comprises an aeration system along a bottom portion thereof, wherein the engineered wetland is configured to remove residual organics, nitrogen, phosphorous related nutrients, BOD, CBOD, TSS, ammonia, nitrate, pharmaceuticals, personal care products, bacteria, viruses and inorganic constituents from the wastewater. In some embodiments, the system further comprises at least one metal oxide cell (e.g. bauxite residue), in liquid communication with the engineered wetland, wherein the metal oxide cell comprises a module encasing a media (e.g. bauxite residue), wherein the module is configured to permit water to flow there through, further wherein the cell removes bacteria, viruses, ammonia, pharmaceuticals, and personal care products from the wastewater; further wherein, via the system contaminants are removed.

In another aspect of the instant disclosure, a method is provided, comprising: flowing a wastewater stream having contaminants therein through an anaerobic settling/treatment tank, wherein the anaerobic settling/treatment tank removes a portion of suspended solids and organic material, flowing the wastewater from the anaerobic tank (e.g. settling and treatment tank) through at least one engineered wetland, wherein the engineered wetland comprises an aeration system that aerates the wastewater, wherein via the engineered wetland, contaminants are removed. In some embodiments, the method further comprises flowing the wastewater from the engineered wetland through at least one cell comprising bauxite residue, wherein the cell polishes the wastewater stream to provide a cleaned water stream/effluent.

In yet another aspect of the instant disclosure, a method is provided. The method comprises the steps of: flowing wastewater through a wastewater treatment system comprising an anaerobic settling/treatment tank; an engineered wetland; and a cell comprising bauxite residue, wherein the wastewater system removes contaminants from a wastewater stream to below permit levels.

In still another aspect, a method of treating wastewater is provided, comprising: flowing a wastewater stream through at least one anaerobic settling and treatment tank, wherein the anaerobic settling and treatment tank comprises: a bottom and at least one sidewall, an influent end and an effluent end in liquid communication with a control volume in the tank, wherein the control volume is configured to retain wastewater; wherein the tank further comprises a baffle configuration, including: a baffle located adjacent to the influent end and configured to distribute the flow of wastewater into the tank; and at least one member configured between the baffle and the effluent end wall, wherein the member configured to promote mixing and flow distribution of the wastewater, and a settling promoter configured along the effluent end sidewall and configured to promote settling of solids prior to discharge from the effluent end; wherein the baffle configuration is configured to flow wastewater through the tank along at least one predetermined flow path at a surface overflow rate of at least 0.25 m/hr; and treating the wastewater in the anaerobic settling and treatment tank via the baffle configuration and surface overflow rate to remove at least 75% of organics from the wastewater stream to provide a low organics wastewater stream; flowing a low organics wastewater stream into an engineered wetland from the anaerobic settling treatment tank effluent, wherein the engineered wetland is in liquid communication with the anaerobic settling and treatment tank; aerating the low organics wastewater stream, wherein aerating the low organics wastewater is sufficient to sustain aerobic bacteria; treating the low organics wastewater stream in the engineered wetland to remove: ammonia from the low organics wastewater to a content of not greater than 8 ppm, wherein the engineered wetland comprises a pore water hydraulic retention time of not greater than 4 days; discharging a treated water stream from the engineered wetland.

In some embodiments, aerating comprises aerating the low organics wastewater at a rate of at least 1.1 scfm/gpm wastewater.

In some embodiments, aerating is sufficient to sustain a dissolved oxygen content of at least about 80% of saturation of the low organics wastewater at a given temperature.

In some embodiments, the method comprise: flowing a low nitrogen wastewater stream from the engineered wetland to an inlet of at least one polishing cell having media including bauxite residue, where the cell is in liquid communication with the engineered wetland, wherein the polishing cell comprises at least one sidewall, an inlet and an outlet configured to encase the media within the cell, wherein the cell is configured to permit the low nitrogen wastewater stream to flow therethrough via the inlet and outlet, and treating the low nitrogen wastewater via the via the media to remove at least about 30% pathogens from the low nitrogen wastewater; and flowing a polished water stream from the effluent from the cell.

In some embodiments, the bauxite residue cell is used in place of the discharge step. In some embodiments, flowing a polished water stream from the effluent of the cell comprises the discharge step.

In another aspect of the instant disclosure, a method is provided, comprising: analyzing a wastewater stream to determine a contaminant profile, the contaminant profile comprising: at least one contaminant; selecting a target cleaned water stream profile, wherein the cleaned water stream profile comprises upper limits of the quantities of contaminants present in the contaminant profile; and selecting, based on the target cleaned water stream profile and the contaminant profile of the wastewater stream, a number of tank modules, based on the contaminant profile; selecting, based on the target cleaned water stream profile and the contaminant profile of the wastewater stream, a number of engineered wetland modules, based on the contaminant profile; selecting, based on the target cleaned water stream profile and the contaminant profile of the wastewater stream, a number of bauxite residue modules, based on the contaminant profile; configuring a wastewater treatment system, where the system comprises a first zone having the number of tank modules, a second zone comprising the number of engineered wetland modules, and a third zone comprising the number of bauxite residue modules to define a wastewater flow path; flowing the wastewater stream through the flow path defined by the first zone, the second zone, and the third zone of the system; and treating the wastewater via the system to remove contaminants via the first zone, the second zone, and the third zone; and discharging a cleaned water stream, wherein the cleaned water stream comprises a cleaned water stream profile which corresponds to the target cleaned water stream profile.

In some embodiments, selecting is based upon the discharge permit levels for a particular contaminant. In some embodiments, selecting is based upon quantity/amount of contaminant in the wastewater stream to be treated. In some embodiments, selecting is based upon the total number of modules in a zone (e.g. where each module in a zone will remove a portion of a contaminant to provide an additive effect at the desired target contaminant profile). In some embodiments, selecting is based upon the number of zones (e.g. where a category of contaminants or type of contaminant is removed in both zones) and/or modules in each zone.

In some embodiments, the method comprises: replacing at least one module of the tank modules, wetland modules, or bauxite residue modules after a predetermined amount of time. In some embodiments, the method comprises: replacing at least one module of the tank modules, wetland modules, or bauxite residue modules after a predetermined amount of wastewater has been treated. In some embodiments, the method comprises: monitoring at least one module in the wastewater treatment system to assess the effectiveness of the module.

In some embodiments, the method comprises moving at least one module via a transport device configured to the module to allow mobility of the module. Some non-limiting examples of the transport device include: wheels, a track and wheels, a plurality of rollers, a conveyor belt, and combinations thereof.

In some embodiments, the method includes: connecting the plurality of modules in the system via connection ports as the inlet and outlet.

In another aspect, a method of treating wastewater is provided, comprising: flowing a wastewater stream through at least one anaerobic settling and treatment tank, wherein the anaerobic settling and treatment tank comprises: a bottom and at least one sidewall, an influent end and an effluent end in liquid communication with a control volume in the tank, wherein the control volume is configured to retain wastewater; wherein the tank further comprises a baffle configuration, including: a baffle located adjacent to the influent end and configured to distribute the flow of wastewater into the tank; and at least one member configured between the baffle and the effluent end wall, wherein the member configured to promote mixing and flow distribution of the wastewater, and a settling promoter configured along the effluent end sidewall and configured to promote settling of solids prior to discharge from the effluent end; wherein the baffle configuration is configured to flow wastewater through the tank along at least one predetermined flow path at a surface overflow rate of at least 0.25 m/hr; and treating the wastewater in the anaerobic settling and treatment tank via the baffle configuration and surface over flow rate to remove at least 75% of organics from the wastewater stream to provide a low organics wastewater stream; flowing a low organics wastewater stream into an engineered wetland from the anaerobic settling treatment tank effluent, wherein the engineered wetland is in liquid communication with the anaerobic settling and treatment tank; aerating the low organics wastewater stream, wherein aerating the low organics wastewater is sufficient to sustain aerobic bacteria; treating the low organics wastewater stream in the engineered wetland to remove ammonia from the low organics wastewater to a content of not greater than 8 ppm to provide a low nitrogen wastewater stream, wherein the engineered wetland comprises a pore water hydraulic retention time of not greater than 4 days; flowing the low nitrogen wastewater stream from the engineered wetland to an inlet of at least one polishing cell having media including bauxite residue, where the cell is in liquid communication with the engineered wetland, wherein the polishing cell comprises at least one sidewall, an inlet and an outlet configured to encase the media within the cell, wherein the cell is configured to permit the low nitrogen wastewater stream to flow therethrough via the inlet and outlet, and treating the low nitrogen wastewater via the via the media to remove at least about 30% pathogens from the low nitrogen wastewater; and discharging a treated water stream from the engineered wetland.

In some embodiments, the system comprises a hydraulic retention time of at least 12.5 hours to not greater than 6.5 days.

In one aspect, a method of treating wastewater is provided, comprising: directing wastewater through at least one anaerobic settling and treatment tank, wherein the anaerobic settling and treatment tank comprises: a bottom and at least one sidewall, an influent end and an effluent end in liquid communication with a control volume in the tank, wherein the control volume is configured to retain wastewater; wherein the tank further comprises a baffle configuration, including: (a) a hockey stick-shaped baffle located adjacent to the influent end and configured to distribute the flow of wastewater into the tank; and (b) at least one member configured between the hockey stick-shaped baffle and the effluent end wall, the hockey stick-shaped baffle configured to promote mixing and flow distribution of the wastewater, and (c) a settling promoter configured along the effluent end sidewall and configured to promote settling of solids prior to discharge (e.g. and/or prevent short circuiting by mixing of the wastewater in the control volume); wherein the baffle configuration is sufficiently designed to direct wastewater through the tank along at least one predetermined flow path at a surface overflow rate of at least 0.25 m/hr (e.g. to not greater than 0.75 m/hr); and wherein, via the baffle configuration and the velocity, the anaerobic settling and treatment tank is configured to remove at least 75% (e.g. to not greater than 99.9%) of organics from the wastewater stream (e.g. measured via BOD, COD); directing wastewater to an engineered wetland from the anaerobic settling treatment tank, wherein the wetland is in liquid communication with the anaerobic settling and treatment tank, wherein the engineered wetland comprises an aeration system along a bottom portion thereof, wherein via the anaerobic settling tank, the wetland is configured to: remove ammonia from the wastewater to a content of not greater than 8 ppm, wherein the engineered wetland comprises a pore water hydraulic retention time of at least about 0.25 day (e.g. to not greater than 2 days).

In some embodiments, the wetland influent comprises a COD of not greater than 400 ppm and influent BOD of not greater than 250 ppm.

In some embodiments, the surface over flow rate of the anaerobic tank is: at least 0.25 m/hr; at least 0.3 m/hr; at least 0.35 m/hr; at least 0.4 m/hr; at least 0.45 m/hr; at least 0.5 m/hr; at least 0.55 m/hr; at least 0.6 m/hr; at least 0.65 m/hr; at least 0.7 m/hr; or at least 0.75 m/hr.

In some embodiments, the surface over flow rate of the anaerobic tank is: not greater than 0.25 m/hr; not greater than 0.3 m/hr; not greater than 0.35 m/hr; not greater than 0.4 m/hr; not greater than 0.45 m/hr; not greater than 0.5 m/hr; not greater than 0.55 m/hr; not greater than about 0.6 m/hr; not greater than 0.65 m/hr; not greater than 0.7 m/hr; or not greater than 0.75 m/hr.

In some embodiments, the method comprises removing ammonia from the wastewater to a content of not greater than 1 ppm.

In some embodiments, the anaerobic settling and treatment tank is configured to promote settling of solids (e.g. via the baffle configuration) and/or the surface overflow rate.

In some embodiments, the anaerobic settling tank is configured to promote mixing of the wastewater in the tank, via the baffle configuration (e.g. in the mixing zone, located above the solids zone).

In some embodiments, the settling promoter comprises an angle baffle configured to the sidewall proximate an effluent end. In some embodiments, the settling promoter comprises a discontinuous region (e.g. raised ridge, arcuate portion extending towards the inner control volume of the tank, etc) along the at least one sidewall proximate an effluent end.

In some embodiments, the settling promoter is configured to act as a directional mixing baffle (e.g. direct wastewater towards the mixing zone).

In some embodiments, the directional mixing baffle is angled in the same manner as the lower portion of the hockey-stick shaped baffle, when compared to the bottom of the tank. In some embodiments, the directional mixing baffle (e.g. member) is angled in a different manner as the lower portion of the hockey-stick shaped baffle, when compared to the bottom of the tank.

In some embodiments, via the baffle configuration comprising a series of baffles (e.g. hockey stick-shaped, at least one member and settling promoter) the wastewater stream is forced to flow over and under the baffles such that the interaction between microorganisms in the solids and wastewater is increased such that the removal of Biological Oxygen Demand (BOD) is enhanced.

In some embodiments, the at least one member comprises a flow vane configured to slow the flow of wastewater through the control volume and/or promote settling of solids.

In some embodiments, the anaerobic settling tank comprises a plurality of members spaced apart from one another, between the hockey stick-shaped baffle and the settling promoter.

In some embodiments, the anaerobic settling tank includes: at least one member; at least two members; at least three members; at least four members; at least five members' at least six members; at least seven members; at least eight members; at least nine members; or at least ten members.

In some embodiments, the anaerobic settling tank includes: not greater than one member; not greater than two members; not greater than three members; not greater than four members; not greater than five members' not greater than six members; not greater than seven members; not greater than eight members; not greater than nine members; or not greater than ten members.

In some embodiments, the members are spaced apart from and are parallel to the angled part of hockey stick. In some embodiments, the members are equidistant from each other and comprise the same angled position within the tank, wherein the three members are located proximate to a lower end of the tank.

In some embodiments, the anaerobic settling and treatment tank is configured to remove metals from the wastewater stream. In some embodiments, the metals include: lead, zinc, cadmium, iron, molybdenum, and combinations thereof. In some embodiments, via the anaerobic settling and treatment tank, at least about 90% (e.g. to approximately 99%) of the metals are removed.

In some embodiments, the anaerobic tank removes metals including Zn, Cd, Fe, and Mb to: at least 90%; at least 92% at least 94% at least 96% at least 98%; or at least 99%.

In some embodiments, the anaerobic tank removes metals including Zn, Cd, Fe, and Mb to: not greater than 90%; not greater than 92% not greater than 94% not greater than 96% not greater than 98%; or not greater than 99%.

In some embodiments, the anaerobic settling and treatment tank is configured to remove at least 70% of the phosphate from the wastewater stream (e.g. as measured in the effluent). In some embodiments, by adding flocculating media to the anaerobic tank, the phosphate removal is increased (e.g. above 70%, or above 85%).

In some embodiments, the anaerobic tank removes: at least 60%; at least 65%; at least 70%; at least 75%; at least 80% of phosphate from the wastewater stream.

In some embodiments, the anaerobic tank removes: not greater than 60%; not greater than 65%; not greater than 70%; not greater than 75%; not greater than 80% of phosphate from the wastewater stream.

In some embodiments, the anaerobic settling and treatment tank is configured to remove nitrate such that the effluent from the anaerobic settling and treatment tank comprises at least 70% removal.

In some embodiments, the anaerobic tank is configured to remove: at least 70%; at least 75%; at least 80%; at least 85%; at least 90%; at least 95%; or at least 99% of nitrate from the wastewater (e.g. as measured in the effluent).

In some embodiments, the anaerobic tank is configured to remove: not greater than 70%; not greater than 75%; not greater than 80%; not greater than 85%; not greater than 90%; not greater than 95%; or not greater than 99% of nitrate from the wastewater (e.g. as measured in the effluent).

In some embodiments, the anaerobic settling and treatment tank is configured to remove nitrogen such that the effluent from the anaerobic settling and treatment tank comprises at least 30% removal.

In some embodiments, the anaerobic tank is configured to remove: at least 30%; at least 35%; at least 40%; at least 45%; at least 50%; at least 55%; at least 60%; at least 65%; at least 70%; at least 75%; or at least 80% of nitrogen from the wastewater (e.g. as measured in the effluent).

In some embodiments, the anaerobic tank is configured to remove: not greater than 30%; not greater than 35%; not greater than 40%; not greater than 45%; not greater than 50%; not greater than 55%; not greater than 60%; not greater than 65%; not greater than 70%; not greater than 75%; or not greater than 80% of nitrogen from the wastewater (e.g. as measured in the effluent).

In some embodiments, the anaerobic settling and treatment tank is configured to remove total suspended solids such that the effluent from the anaerobic settling and treatment tank comprises at least 90% removal.

In some embodiments, the anaerobic settling and treatment tank comprises a solids zone and a mixing zone.

In some embodiments, the settling and treatment tank comprises media configured to promote flocculation with bacteria and settling of solids. Non-limiting examples of media include: granular activated carbon, powdered activated carbon, clay particles, bauxite residue; gypsum; and combinations thereof.

In some embodiments, metal salts are added to the first zone (e.g. anaerobic settling tank). Some non-limiting examples of metal salts include: Fe, Ca and/or Al salts. Without being bound to a particular mechanism or theory, it is believed that adding metal salts into this anaerobic environment will reduce influent phosphorous levels less than 0.5 ppm.

In some embodiments, addition of metal salts into the anaerobic settling/treatment tank reduces the nitrates amount in a wastewater stream from about 10 ppm to about 1 ppm.

In some embodiments, metal salts are added to the anaerobic settling/treatment tank to achieve <0.1 ppm phosphorous in the final effluent. In some embodiments when supplemental organics are added to the engineered wetland, an additional aeration zone or step is completed. Without being bound to a particular mechanism or theory, this is believed to reduce the amount/presence of residual organics added which remain in the wastewater.

In some embodiments, the engineered wetland is configured to remove TSS at the influent to less than 60 ppm.

In some embodiments, the wetland is configured to remove TSS in the wastewater to: not less than 60 ppm; not less than 55 ppm; not less than 50 ppm; not less than 45 ppm; not less than 40 ppm; not less than 35 ppm; not less than 30 ppm; not less than 25 ppm; not less than 20 ppm; not less than 15 ppm; not less than 10 ppm; or not less than 5 ppm.

In some embodiments, the wetland is configured to remove TSS in the wastewater to: not greater than 60 ppm; not greater than 55 ppm; not greater than 50 ppm; not greater than 45 ppm; not greater than 40 ppm; not greater than 35 ppm; not greater than 30 ppm; not greater than 25 ppm; not greater than 20 ppm; not greater than 15 ppm; not greater than 10 ppm; or not greater than 5 ppm.

In some embodiments, the engineered wetland is configured to remove BOD from the influent wastewater to less than 50 ppm.

In some embodiments, the wetland is configured to remove BOD in the wastewater to: not less than 50 ppm; not less than 45 ppm; not less than 40 ppm; not less than 35 ppm; not less than 30 ppm; not less than 25 ppm; not less than 20 ppm; not less than 15 ppm; not less than 10 ppm; or not less than 5 ppm.

In some embodiments, the wetland is configured to remove BOD in the wastewater to: not greater than 50 ppm; not greater than 45 ppm; not greater than 40 ppm; not greater than 35 ppm; not greater than 30 ppm; not greater than 25 ppm; not greater than 20 ppm; not greater than 15 ppm; not greater than 10 ppm; or not greater than 5 ppm.

In some embodiments, the engineered wetland is configured to remove COD from the wastewater to less than 100 ppm.

In some embodiments, the wetland is configured to remove COD (CBOD) in the wastewater to: not less than 100 ppm; not less than 95 ppm; not less than 90 ppm; not less than 85 ppm; not less than 80 ppm; not less than 75 ppm; not less than 70 ppm; not less than 65 ppm; not less than 60 ppm; not less than 55 ppm; not less than 50 ppm; not less than 45 ppm; not less than 40 ppm; not less than 35 ppm; not less than 30 ppm; not less than 25 ppm; not less than 20 ppm; not less than 15 ppm; not less than 10 ppm.

In some embodiments, the wetland is configured to remove COD (CBOD) in the wastewater to: not greater than 100 ppm; not greater than 95 ppm; not greater than 90 ppm; not greater than 85 ppm; not greater than 80 ppm; not greater than 75 ppm; not greater than 70 ppm; not greater than 65 ppm; not greater than 60 ppm; not greater than 55 ppm; not greater than 50 ppm; not greater than 45 ppm; not greater than 40 ppm; not greater than 35 ppm; not greater than 30 ppm; not greater than 25 ppm; not greater than 20 ppm; not greater than 15 ppm; not greater than 10 ppm.

In some embodiments, the engineered wetland is configured to remove nitrogen from the wastewater such that effluent from the engineered wetland comprises a nitrogen content of less than 40 ppm.

In some embodiments, the wetland is configured to remove nitrogen in the wastewater to: not less than 40 ppm; not less than 35 ppm; not less than 30 ppm; not less than 25 ppm; not less than 20 ppm; not less than 15 ppm; not less than 10 ppm; not less than 8 ppm; not less than 6 ppm; not less than 4 ppm; or not less than 2 ppm.

In some embodiments, the wetland is configured to remove nitrogen in the wastewater to: not greater than 40 ppm; not greater than 35 ppm; not greater than 30 ppm; not greater than 25 ppm; not greater than 20 ppm; not greater than 15 ppm; not greater than 10 ppm; not greater than 8 ppm; not greater than 6 ppm; not greater than 4 ppm; or not greater than 2 ppm.

In some embodiments, the engineered wetland is configured to remove phosphorous from the wastewater to less than 40 ppm (e.g. comparing the effluent to the influent/as measured in the effluent).

In some embodiments, the wetland is configured to remove phosphorous in the wastewater to: not less than 40 ppm; not less than 35 ppm; not less than 30 ppm; not less than 25 ppm; not less than 20 ppm; not less than 15 ppm; not less than 10 ppm; not less than 8 ppm; not less than 6 ppm; not less than 4 ppm; or not less than 2 ppm.

In some embodiments, the wetland is configured to remove phosphorous in the wastewater to: not greater than 40 ppm; not greater than 35 ppm; not greater than 30 ppm; not greater than 25 ppm; not greater than 20 ppm; not greater than 15 ppm; not greater than 10 ppm; not greater than 8 ppm; not greater than 6 ppm; not greater than 4 ppm; or not greater than 2 ppm.

In some embodiments, directing the wastewater though an engineered wetland further comprises aerating the wastewater as it travels through the engineered wetland.

In some embodiments, the wetland comprises an aeration system along the bottom portion. In some embodiments, the aeration system comprises a series of aeration devices configured to provide oxygen (e.g. air having oxygen in it, or oxygen gas) to the microorganisms attached to the growth media (to feed the microorganisms and promote degradation of organics such as nitrogen, BOD and COD).

In some embodiments, the wetland is sufficiently aerated to remove contaminants from wastewater. As used herein, "sufficiently aerated" meet or exceed theoretical oxygen demand (based on COD, BOD, $NH_3$) for an influent WW stream. In some embodiments, sufficiently aerated includes having a dissolved oxygen content of at least about 80% of saturation (where dissolved oxygen content is specific to the water temperature of the wastewater).

In some embodiments, the wetland comprises aerobic portions. In some embodiments, the wetland comprises anaerobic portions. In some embodiments, the wetland comprises anaerobic portions. In some embodiments, the wetland comprises a combination of aerobic and anoxic portions. In some embodiments, the wetland comprises a combination of anaerobic and aerobic portions.

In some embodiments, the rate of aeration to the wastewater in the engineered wetland is: at least 1 standard cubic feet per minute (scfm) air per gallon per minutes (gpm) of wastewater flow. In some embodiments, the rate of aeration to the wastewater in the engineered wetland is at least 1 scfm air/gpm wastewater to not greater than 25 scfm air/gpm wastewater.

In some embodiments, the rate of aeration to the wastewater (e.g. a portion of wastewater in the wetland) is: at least 1 scfm air/gpm wastewater; at least 5 scfm air/gpm wastewater; at least 10 scfm air/gpm wastewater; at least 15 scfm air/gpm wastewater; at least 20 scfm/gpm wastewater; or at least 25 scfm air/gpm wastewater.

In some embodiments, the rate of aeration to the wastewater (e.g. a portion of wastewater in the wetland) is: not greater than 1 scfm air/gpm wastewater; not greater than 5 scfm air/gpm wastewater; not greater than 10 scfm air/gpm wastewater; not greater than 15 scfm air/gpm wastewater; not greater than 20 scfm/gpm wastewater; or not greater than 25 scfm air/gpm wastewater.

In some embodiments, the wetland is configured to treat wastewater at a 0.25 day pore volume hydraulic residence time. In some embodiments, the wetland is configured to treat wastewater: at least 0.5 hour pore volume hydraulic residence time; at least a 0.75 hour pore volume hydraulic residence time; at least a 1 day pore volume hydraulic residence time; at least a 1.25 day pore volume hydraulic residence time; at least a 1.5 day pore volume hydraulic residence time; at least a 1.75 pore volume hydraulic residence time, or at least a 2 day pore volume hydraulic residence time (e.g. through the wetland).

In some embodiments, the wetland is configured to treat wastewater at a 0.25 day pore volume hydraulic residence time. In some embodiments, the wetland is configured to treat wastewater: not greater than 0.5 hour pore volume hydraulic residence time; not greater than a 0.75 hour pore volume hydraulic residence time; not greater than a 1 day pore volume hydraulic residence time; not greater than a 1.25 day pore volume hydraulic residence time; not greater than a 1.5 day pore volume hydraulic residence time; not greater than a 1.75 pore volume hydraulic residence time, or not greater than a 2 day pore volume hydraulic residence time (e.g. through the wetland).

In some embodiments, the method comprises: directing the effluent from the engineered wetland to an inlet of at least one polishing cell having media including bauxite residue, where the cell is in liquid communication with the engineered wetland, wherein the polishing cell comprises at least one sidewall, an inlet and an outlet configured to encase the media within the cell, wherein the cell is configured to permit water to flow therethrough via the inlet and outlet, further wherein via the media the cell removes contaminants from a water stream. Non-limiting examples of contaminants removed via the bauxite residue cell include (where present): bacteria, viruses, ammonia, pharmaceuticals, and personal care products.

In some embodiments, the bauxite residue cell removes at least 80% removal of pathogens (e.g. influent averaging 10,000 cfu/100 mL to an effluent averaging 2,000 cfu/100 mL) to 99% removal of pathogens (e.g. influent averaging 1,000 cfu/100 mL to effluent averaging 10 cfu/100 mL) (where pathogen removal is indicated by fecal coliform removal).

In some embodiments, the bauxite residue cell removes: at least 60%; at least 65%; at least 70%; at least 75 wt. %; at least 80%; at least 85%; at least 90%; at least 95%; at least 98%; or at least 99% of pathogens (e.g. by measuring and comparing the pathogen content in the influent and the effluent streams).

In some embodiments, the bauxite residue cell removes: not greater than 60%; not greater than 65%; not greater than 70%; not greater than 75%; not greater than 80%; not greater than 85%; not greater than 90%; not greater than 95%; not greater than 98%; or not greater than 99% of pathogens (e.g. by measuring and comparing the pathogen content in the influent and the effluent streams).

In another aspect of the instant disclosure, a method of treating wastewater is provided, comprising: comprising: removing solids and organics from a wastewater stream via an anaerobic settling and treatment tank comprising a baffle configuration including a hockey stick shaped baffle, a plurality of members spaced from the hockey stick shaped baffle and the effluent, and a settling promoter baffle positioned along the effluent end wall of the tank and configured to provide a surface over flow of at least 0.25 m/hr; removing ammonia from a wastewater stream via an aerated, engineered wetland, where aeration is at least 1.1 scfm/gpm of wastewater; and removing bacteria from the wastewater stream via a bauxite residue cell.

In some embodiments, aerating is sufficient to provide wastewater having a dissolved oxygen content of at least about 50% of saturation up to 90% saturation, for that water temperature. In some embodiments, aerating is sufficient to provide wastewater having a dissolved oxygen content of at least about 60% of saturation up to 80% of saturation, for the particular water temperature. In some embodiments, aerating is sufficient to support and sustain aerobic bacteria.

In some embodiments, aeration is sufficient such that the wastewater in the engineered wetland has a dissolved oxygen content of: at least 10% of saturation; at least 20% of saturation; at least 30% of saturation; at least 40% of saturation; at least 50% of saturation; at least 60% of saturation; at least 70% of saturation; at least 80% of saturation; at least 90% of saturation; at least 100% of saturation; or above saturation.

In some embodiments, aeration is sufficient such that the wastewater in the engineered wetland has a dissolved oxygen content of: not greater than 10% of saturation; not greater than 20% of saturation; not greater than 30% of saturation; not greater than 40% of saturation; not greater than 50% of saturation; not greater than 60% of saturation; not greater than 70% of saturation; not greater than 80% of saturation; not greater than 90% of saturation; not greater than 100% of saturation; or above saturation.

In one embodiment, aeration devices are set up parallel to the direction of water flow. In one embodiment, the aeration devices are set up perpendicular to the wastewater flow. In one embodiment, the aeration devices are set up angled to the direction of the water flow. In one embodiment, the aeration devices are set up in a combination of at least parallel, perpendicular, and angled with respect to the direction of water flow through the wastewater treatment stream.

In another aspect of the instant disclosure, a wastewater treatment apparatus, is provided, comprising: a unit having at least one sidewall, an inlet, and an outlet, wherein the sidewall completely encases an inner void of the unit but for the inlet and the outlet; at least one distribution plate located in the inner void and positioned between the inlet and the outlet, where the distribution plate comprises holes configured to distribute and direct wastewater through the inner void; and media comprising bauxite residue located in the inner void between the inlet and the outlet, wherein the media is configured to treat water and remove contaminants therefrom.

In some embodiments, the media consists essentially of bauxite residue.

In some embodiments, the media further comprises at least one of: zero valent iron (ZVI); carbon; organic binder material (e.g. polymers); inorganic binder material (e.g. water, cement); and combinations thereof.

In some embodiments, the media is pelletized. In some embodiments, the pelletized media comprises an average particle size of at least 1/8" to not greater than 3/8".

In some embodiments, the pelletized media has comprises an average particle size of: at least 1/16"; at least 1/8"; at least 1/2"; at least 2/3"; at least 1/4"; or at least 1". In some embodiments, the pelletized media has comprises an average particle size of: not greater than 1/16"; not greater than 1/8"; not greater than 1/2"; not greater than 2/3"; not greater than 3/4"; or not greater than 1".

In some embodiments, the average particle size of the media in the bauxite residue cell (non-pelletized or pelletized) is from about 1/20" to about 3".

In some embodiments, the average particle size of the media in the bauxite residue cell is: at least 1/16"; at least 1/8"; at least 1/4" at least 1/4" at least 1/4"; or, at least 1". In some embodiments, the average particle size of the media in the bauxite residue is: at least 1"; at least 1.5"; at least 2"; at least 2.5" or at least 3".

In some embodiments, the average particle size of the media in the bauxite residue cell is: not greater than 1/16"; not greater than 1/8"; not greater than 1/4" not greater than 1/4" not greater than 1/4"; or, not greater than 1". In some embodiments, the average particle size of the media in the bauxite residue is: not greater than 1"; not greater than 1/5"; not greater than 2"; not greater than 2.5" or not greater than 3".

In some embodiments, the unit includes two distribution plates configured in a spaced relation and further wherein the holes of each distribution plate are off-set from each other (e.g. to promote distribution/mixing of the water).

In some embodiments, the holes in the distribution plate are selected from: concentric holes of the same size, concentric holes of different sizes, or slits (e.g. spanning nearly the length or width of the distribution plate).

In some embodiments, the inlet and the outlet are configured as connection ports (e.g. disconnect valves, for snap-on connect/disconnect of the inlet and outlet).

In some embodiments, the sidewall further comprises an access door, wherein the access door is configured to cooperate with the sidewall to completely encase the inner void, further wherein the access door is configured to open and allow media to be inserted or removed from the inner void.

In some embodiments, the apparatus comprises a liner configured to house the media and retain the media within the at least one sidewall. In some embodiments, the liner comprises at least one handle configured to allow removal of the liner and the media contained within the liner from the BR cell (e.g. via forklift, tow line, crane, manual operation, etc).

In some embodiments, the apparatus comprises sand between the bauxite residue media and the inlet. In some embodiment, the apparatus comprises sand between the bauxite residue media and the outlet.

In some embodiments, the wastewater is aerated at the inlet (e.g. prior to entry into the media). In some embodiments, the media retained in the inner void is aerated via aeration devices (e.g. positioned along the bottom or along the sides or adjacent to the inlet or next to the distribution plates).

In some embodiments, the apparatus comprises a transport device configured to the sidewall (e.g. outer side of the sidewall, e.g. lowermost end or bottom) where the transport device is configured to promote mobility of the BR cell. As non-limiting examples, the transport device includes: wheels, a track and wheels, a plurality of rollers, a conveyor belt, and combinations thereof.

In some embodiments, the apparatus comprises at least one support (e.g. handle), where the support is configured to allow the BR cell module to be lifted and adjusted/moved, replaced.

In another aspect of the instant disclosure, a method is provided, comprising: analyzing a wastewater treatment stream to determine a contaminant profile, the contaminant profile comprising at least one contaminant; selecting a number of tank modules, wetland modules, and bauxite residue modules based on the contaminant profile; configuring a wastewater treatment system comprising the tank modules, wetland modules, and bauxite residue modules to define a wastewater flow path; directing a wastewater influent through the wastewater treatment system via the flowpath; removing contaminants from the wastewater via the tank modules, wetland modules, and bauxite residue modules such that the effluent from the wastewater treatment system comprises an effluent profile, where the levels of contaminants in the effluent profile are less than the levels of contaminants in the contaminant profile. In some embodiments, the effluent profile comprises levels of contaminants that are less than government regulated permit levels for discharge of water into the environment.

In some embodiments, the method comprises: replacing at least one module of the tank modules, wetland modules, or bauxite residue modules after a predetermined amount of time. In some embodiments, the method comprises: replacing at least one module of the tank modules, wetland modules, or bauxite residue modules after a predetermined amount of wastewater has been treated.

In some embodiments, the method further comprises monitoring each module in the wastewater treatment system to assess the module's effectiveness. In some embodiments, monitoring comprises analyzing water samples from the influent and effluent of each module (e.g. via monitoring wells, monitors, etc) and comparing the values to a target treatment range for that type of module (e.g. anaerobic tank, engineered wetland, bauxite residue cell).

In some embodiments, the water effluent from the system comprises a pH of: at least 6 to not greater than 9.

In some embodiments, the hydraulic retention time of the anaerobic settling and treatment tank is at least 0.25 day; at least 0.50 day; at least 0.75 clay; at least 1 day; at least 1.25 day; at least 1.5 day; at least 1.75 day; or at least 2 days.

In some embodiments, the hydraulic retention time of the anaerobic settling and treatment tank is: not greater than 0.25 day; not greater than 0.50 day; not greater than 0.75 day; not greater than 1 day; not greater than 1.25 day; not greater than 1.5 day; not greater than 1.75 day; or not greater than 2 days.

In some embodiments, the hydraulic retention time of the wastewater in the engineered wetland is: at least 0.25 day; at least 0.50 day; at least 0.75 day; at least 1 day; at least 1.25 day; at least 1.5 day; at least 1.75 day; at least 2 days; at least 2.25 days, at least 2.5 days, at least 2.75 days, at least 3 days, at least 3.25 days, at least 3.5 days, at least 3.75 days, or at least 4 days.

In some embodiments, the hydraulic retention time of the wastewater in the engineered wetland is: not greater than 0.25 day; not greater than 0.50 day; not greater than 0.75 day; not greater than 1 day; not greater than 1.25 day; not greater than 1.5 day; not greater than 1.75 day; not greater than 2 days; not greater than 2.25 days, not greater than 2.5 days, not greater than 2.75 days, not greater than 3 days, not greater than 3.25 days, not greater than 3.5 days, not greater than 3.75 days, or not greater than 4 days.

In some embodiments, the hydraulic retention time of the wastewater in the bauxite residue cell is: at least 30 minutes; at least an hour, at least 2 hours; at least 4 hours; at least 6 hours; at least 8 hours; at least 10 hours; or at least 12 hours.

In some embodiments, the hydraulic retention time of the wastewater in the bauxite residue cell is: not greater than 30 minutes; not greater than an hour, not greater than 2 hours; not greater than 4 hours; not greater than 6 hours; not greater than 8 hours; not greater than 10 hours; or not greater than 12 hours.

In some embodiments, the hydraulic retention time of wastewater in the system is at least about 3 to about 8 days. In some embodiments, the hydraulic retention time of wastewater in the system is at least 12½ hours to 6½ days.

In some embodiments, the hydraulic retention time of the wastewater is: at least 12 hours; at least 18 hours; at least 24 hours; at least 30 hours; at least 36 hours; at least 40 hours; at least 48 hours; at least 52 hours; at least 56 hours; at least 60 hours; at least 64 hours; or at least 72 hours.

In some embodiments, the hydraulic retention time of the wastewater is: not greater than 12½ hours; not greater than 18 hours; not greater than 24 hours; not greater than 30 hours; not greater than 36 hours; not greater than 40 hours; not greater than 48 hours; not greater than 52 hours; not greater than 56 hours; not greater than 60 hours; not greater than 64 hours; or not greater than 72 hours.

In one embodiment, the first zone (e.g. anaerobic settling/treatment tank) removes at least about 50% to not greater than 90% of the BOD/COD/TSS. With this embodiment, in the second zone (e.g. aerated wetland(s)) any remaining biodegradable organics are removed up to about 99%. Furthermore, up to 99% of the ammonia is removable via this second zone, as the second zone is configured to convert ammonia to nitrate and, by regulating air flow/aeration (and/or supplemental organics) convert nitrate to nitrogen gas. In some embodiments, the nitrate is taken up by the plants growing in the media. Further, in the third zone (e.g. mixed metal oxide media cell) the wastewater is polished to further remove contaminants (e.g. phosphorous removal to less than 0.1-1 ppm and residual ammonia to less than 0.2 ppm) and disinfected to remove pathogens (e.g. as indicated by measuring non-limiting, examples of pathogens: fecal/total coliform, *e-coli*, viruses, and water-borne organisms such a *giardia*).

In some embodiments, off-gas including methane is captured and used to operate/run a generator to power the system pumps and/or aeration system. In some embodiments, the pumps and/or aeration system are operated by power generated via solar power generated with solar panels. In some embodiments, the pumps and/or aeration systems are operated by wind power generated via wind turbines. In some embodiments, the pumps and or aeration systems are operated with hydraulic power from the water flow through the system. In some embodiments, the wastewater treatment system is a zero energy system, requiring no external power sources to operate the components which require power (e.g. aeration system, pumps).

In some embodiments, by utilizing a three zone system as articulated herein, a smaller footprint (e.g. size) of the wetland is needed to achieve contaminant removal. In some embodiments, "smaller footprint" is quantifiable by a smaller total bed volume per a given surface area of media in the bed.

As used herein, "inlet" means: a location where something enters. In one embodiment, wastewater enters each zone through an inlet in liquid communication with the zone.

As used herein, "outlet" means: a location where something exits. In one embodiment, wastewater exits each zone through an outlet in liquid communication with the zone.

As used herein, "first zone" means: the zone which is closest to the inlet of the system. In some embodiments, the first zone comprises at least one anaerobic tank (sometimes called a settling and treatment tank). In one embodiment, the first zone comprises a plurality of anaerobic tanks. In one embodiment, the anaerobic tank is modular (e.g. mobile, interchangeable).

As used herein, "anaerobic tank" (also called an anaerobic settling/treatment tank) means: a tank in an anaerobic environment where sludge and/or particulates settle from a material and where contaminants are removed (e.g. organics, including BOD, COD). In some embodiments, anaerobic degradation occurs in this tank. In some embodiments, the anaerobic settling tank comprises an anaerobic zone.

In some embodiments, the anaerobic settling tank does not have any media therein.

In some embodiments, the anaerobic tank comprises media.

In some embodiments, the anaerobic tank comprises at least one baffle, which is configured to deflect the flow of water and/or direct the water through a water flow path from the inlet of the tank to the outlet of the tank. In some embodiments, the baffles are integral to the tank. In some embodiments, the baffles are adjustable and/or removable from the tank.

In some embodiments, the wastewater is directed through the sludge (zone or area of high concentration of solids or suspended solids) which forms in the bottom of the tank. Without being bound to a particular mechanism or theory, this is believed to improve the treatment process (e.g. removal of metals, nitrates, phosphates, TSS, VSS, COD, and BCOD). In some embodiments, the anaerobic settling/treatment tank is configured to allow particulates and sludge to settle out from the wastewater (e.g. it was suspended in the water) to the bottom of the tank.

In some embodiments, the tank includes at least one vent to direct off-gases out of the tank and/or maintain pressure within the tank.

In some embodiments, the tank is constructed of non-porous materials or porous materials that have a surface coating of a non-porous material.

As used herein, "baffle" means: an obstruction for deflecting the flow of a material. In some embodiments, the baffles are constructed of various non-reactive (non-degrading) materials. In some embodiments, the baffles comprise a vertical configuration, a horizontal configuration, a curved (arcuate) configuration, or an angled configuration. In some embodiments, the baffle comprises an angled configuration (e.g. hockey stick or dog leg configuration). In some embodiments, the baffles are the same configuration. In some embodiments, the baffles include different configurations. In one or more embodiments, the dimension and shape of the baffles can be varied as desired.

As used herein, "hockey stick-shaped baffle" means a baffle with a straight portion and an angled, lower portion. In some embodiments, the hockey stick-shaped baffle is located closest to the inlet of the anaerobic settling/treatment tank, where the hockey stick-shaped baffle directs wastewater into the tank. In some embodiments, the hockey stick-shaped baffle directs the incoming wastewater through a sludge zone, the area having a high concentration of sludge (particulates, settled solids) in the anaerobic tank.

In some embodiments, the hockey stick-shaped baffle is at an acute angle when compared to the plane created by the bottom of the tank. In some embodiments, the end of the hockey stick-shaped baffle is angled from greater than 0 degrees (where 0 degrees indicates that the member is parallel to the bottom surface of the tank) to not greater than 90 degrees (where 90 degrees indicates that the hockey stick-shaped baffle is perpendicular to the bottom of the tank, or in a straight line with the rest of the body of the baffle). In some embodiments, the hockey-stick shaped baffle comprises an angle of between 30 to 80 degrees. In some embodiments, the hockey stick shaped baffle comprises an angle of between 45 and 60 degrees.

In some embodiments, the hockey stick-shaped baffle as an angle that is: at least 5 degrees; at least 10 degrees; at least 15 degrees; at least 20 degrees; at least 25 degrees; at least 30 degrees; at least 35 degrees; at least 40 degrees; at least 45 degrees; at least 50 degrees; at least 55 degrees; at least 60 degrees; at least 65 degrees; at least 70 degrees; at least 75 degrees; at least 80 degrees; or at least 85 degrees.

In some embodiments, the hockey stick shaped baffle has an angle that is: not greater than 5 degrees; not greater than 10 degrees; not greater than 15 degrees; not greater than 20 degrees; not greater than 25 degrees; not greater than 30 degrees; not greater than 35 degrees; not greater than 40 degrees; not greater than 45 degrees; not greater than 50 degrees; not greater than 55 degrees; not greater than 60 degrees; not greater than 65 degrees; not greater than 70 degrees; not greater than 75 degrees; not greater than 80 degrees; or not greater than 85 degrees.

As used herein, "member" means an object positioned in the anaerobic tank. In some embodiments, the member is a baffle which is placed in the path of the wastewater so that the wastewater is deflected, slows, and solids settle out from the wastewater. In some embodiments, the member is positioned between the hockey stick-shaped baffle and the outlet, in the control volume of the tank.

In some embodiments, the member is at an acute angle when compared to the plane created by the bottom of the tank. In some embodiments, the member is angled from greater than 0 degrees (where 0 degrees indicates that the member is parallel to the bottom surface of the tank) to not greater than 90 degrees (where 90 degrees indicates that the member is perpendicular to the bottom of the tank). In some embodiments, the member comprises an angle of between 30 to 80 degrees. In some embodiments, the member comprises an angle of between 45 and 60 degrees.

In some embodiments, the member has an angle that is: at least 5 degrees; at least 10 degrees; at least 15 degrees; at least 20 degrees; at least 25 degrees; at least 30 degrees; at least 35 degrees; at least 40 degrees; at least 45 degrees; at least 50 degrees; at least 55 degrees; at least 60 degrees; at least 65 degrees; at least 70 degrees; at least 75 degrees; at least 80 degrees; or at least 85 degrees.

In some embodiments, the member has an angle that is: not greater than 5 degrees; not greater than 10 degrees; not greater than 15 degrees; not greater than 20 degrees; not greater than 25 degrees; not greater than 30 degrees; not greater than 35 degrees; not greater than 40 degrees; not greater than 45 degrees; not greater than 50 degrees; not greater than 55 degrees; not greater than 60 degrees; not greater than 65 degrees; not greater than 70 degrees; not greater than 75 degrees; not greater than 80 degrees; or not greater than 85 degrees.

In some embodiments, the anaerobic tank comprises at least one member. In some embodiments, the anaerobic tank comprises several members spaced apart from each other. In some embodiments, the member is a baffle which deflects the water flow (e.g. to prevent short circuiting and/or dead zones in the anaerobic tank and/or to promote mixing).

In some embodiments, the members are angled in the same way that the lower portion of the hockey stick-shaped baffle is angled. In some embodiments, the members comprise a different angle from the hockey stick-shaped baffle. In some embodiments, the members comprise the same angled configuration (e.g. with reference to the bottom of the tank). In some embodiments, the members comprise different angles from each other (e.g. with reference to the bottom of the tank). In some embodiments, the members are spaced equidistant from each other. In some embodiments, the members are spaced at different distances from each other (e.g. distance between member 1 and member 2 is different from the distance between member 2 and member 3, where members 1-3 are located sequentially and adjacent to each other between the inlet and the outlet of the anaerobic tank).

As used herein, "settling promoter" (sometimes called a prism baffle or angle baffle) means a baffle configured to promote settling of solids from a wastewater stream. In some embodiments, the settling promoter is configured to deflect wastewater towards the center of the tank (e.g. promote mixing and settling of solids). In some embodiments, the settling promoter is a discontinuous portion of the sidewall, angled outward from the sidewall towards the inside of the tank. In some embodiments, the settling promoter is a baffle which is attached to the sidewall proximate to the outlet.

In some embodiments, the settling promoter is at an acute angle when compared to the plane created by the bottom of the tank. In some embodiments, the settling promoter is angled from greater than 0 degrees (where 0 degrees indicates that the member is parallel to the bottom surface of the tank) to not greater than 90 degrees (where 90 degrees indicates that the settling promoter is perpendicular to the bottom of the tank). In some embodiments, the settling promoter comprises an angle of between 30 to 80 degrees. In some embodiments, the settling promoter comprises an angle of between 45 and 60 degrees.

In some embodiments, the settling promoter has an angle that is: at least 5 degrees; at least 10 degrees; at least 15 degrees; at least 20 degrees; at least 25 degrees; at least 30 degrees; at least 35 degrees; at least 40 degrees; at least 45 degrees; at least 50 degrees; at least 55 degrees; at least 60 degrees; at least 65 degrees; at least 70 degrees; at least 75 degrees; at least 80 degrees; or at least 85 degrees.

In some embodiments, the settling promoter has an angle that is: not greater than 5 degrees; not greater than 10 degrees; not greater than 15 degrees; not greater than 20 degrees; not greater than 25 degrees; not greater than 30 degrees; not greater than 35 degrees; not greater than 40 degrees; not greater than 45 degrees; not greater than 50 degrees; not greater than 55 degrees; not greater than 60 degrees; not greater than 65 degrees; not greater than 70 degrees; not greater than 75 degrees; not greater than 80 degrees; or not greater than 85 degrees.

As used herein, "mixing zone" refers to the upper region of the anaerobic settling and treatment tank, located generally above the solids zone, where the solids zone comprising a high concentration of solids. In some embodiments, wastewater is directed/deflected to the mixing zone in order to promote contact (e.g. maximize reaction/contact time) with the organic material and inorganic material of the wastewater stream with the microorganisms located in the tank.

As used herein, "solids zone" refers to the lower region of the anaerobic settling tank, where the solids, organic material, and inorganic material generally settle out and/or flocculate from the wastewater as it travels through the tank.

As used herein, "second zone" means: the zone which is between the first zone and the third zone. In some embodiments, the second zone includes at least one engineered wetland. In some embodiments, the second zone includes a plurality of engineered wetlands. In some embodiments, the engineered wetlands are modular (e.g. mobile, interchangeable units).

As used herein, "engineered wetland" means: a non-naturally occurring wetland. In some embodiments, the engineered wetland comprises an impermeable barrier (liner) which retains a media therein. In some embodiments, the engineered wetland comprises a tank. In some embodiments, the engineered wetland comprises a tank which is portable (e.g. a module). In some embodiments, the wetland comprises an inlet and an outlet in liquid communication with the main body of the wetland. In some embodiments, the wetland comprises an aeration system, which is configured to provide aeration to the water present in the wetland. In some embodiments, the wetland is a horizontal subsurface flow wetland. In some embodiments, the wetland retains media. In some embodiments, the wetland supports vegetation, which grows in the wetland and/or is rooted in the media retained in the wetland.

As used herein, "aeration" means: the process of directing (e.g. circulating) air through something. In some embodiments, the wetland cell comprises aeration to provide air (including oxygen, or dissolved oxygen) to the water present in the wetland. In some embodiments, aeration comprises bubbling oxygen gas into the water. In some embodiments, aeration comprises bubbling air, which includes oxygen gas (along with nitrogen gas and carbon dioxide) into the water.

As used herein, "aeration system" means: a system for producing aeration in a material. In some embodiments, the aeration system aerates the wastewater after it leaves the first zone and before it gets into the second zone (e.g. at the piping/first zone outlet to second zone inlet). In some embodiments, the aeration system aerates the wastewater as it travels through the second zone or portions of the second zone.

In some embodiments, the aeration system includes the following components: a pump, a gauge, an inlet, an outlet (e.g. in the wetland), and piping (to direct the air from the pump through the inlet to the outlet). In some embodiments, the outlet comprises the open end of the piping. In some embodiments, the outlet comprises a plurality or perforations which allow the air to bubble there through. In some embodiments, the outlet is configured with a diffuser, which is configured to diffuse the large air bubbles into smaller air bubbles. In some embodiments, the aeration is adjustable (e.g. coarse bubbles, fine bubbles), such that aeration in a portion or all of a component is configured to be increased, decreased, or varied from one portion of a component (e.g. engineered wetland) to another portion of the component.

In some embodiments, the components of the aeration system which are located within the wetland (e.g. piping, outlet) are referred to as the aeration device. In some embodiments, the aeration device is located in the inlet of the wetland. In some embodiments, the aeration device is located proximate to a portion of the wetland. In some embodiments, the aeration device is located throughout the wetland. In some embodiments, the aeration system is located along the bottom portion of the wetland. In some embodiments, the aeration device is located proximate to the outlet of the wetland.

As used herein, "media" means: a substance having a surface area. In some embodiments, the wetland comprises media (e.g. media retained within the wetland) to provide an area for vegetation to root. In some embodiments, the media within the wetland provides a surface area for bacteria to adhere to and/or a habitat for bacteria to live in. Some non-limiting examples of media include: aggregate (e.g. rocks), sand, lava rocks, ceramic (e.g. beads), plastics (e.g. BioRings™), polymers, compost, mulch, and the like. Further, it is noted that the size and shapes of the media are variable in accordance with one or more embodiments of the instant disclosure in order to provide a desired surface area of media per unit volume of material.

As used herein, "third zone" means: the zone which is closest to the outlet of the system. In some embodiments, the third zone includes at least one cell having bauxite residue therein. In some embodiments, the third zone comprises a plurality of bauxite residue cells. In some embodiments, the bauxite residue cells are modular (e.g. adjustable, movable, interchangeable).

As used herein, "mixed metal oxide media" means a media including two or more metal oxides. One non-limiting example of a mixed metal oxide media includes bauxite residue.

As used herein, "bauxite residue cell" means a cell having bauxite residue media therein. In some embodiments, the wastewater is flowed through the cell in: a downward flow (e.g. gravity), an upward or up-flow (e.g. reverse gravity), a substantially horizontal flow, or combinations thereof. In some embodiments, the cell is constructed of a non-porous material or a porous material with a non-porous coating to retain wastewater therein. In some embodiments, the bauxite residue cell is configured to operate as a filter to remove contaminants from a wastewater stream.

Without being bound to a particular mechanism or theory, it is believed that the bauxite residue cell removes pollutants through one or more mechanisms including: filtration, predation, adsorption, absorption, ion exchange, nitrification, oxidation, chemical degradation, and free radical reduction.

As used herein, "bauxite residue" means: a particulate alkaline clay. Bauxite residue includes a plurality of metals and metal oxides therein. As a non-limiting example, raw alkaline clay includes alkaline clay which has transformed/changed due to neutralization (e.g. the prolonged exposure to atmospheric carbon dioxide and/or contact with anthropogenic carbon dioxide, and as a result, is generally free from draining liquids and is more neutral than its original, alkaline form.

As used herein, "ZVI" means: zero valent iron (e.g. iron metal). Some non-limiting examples of ZVI include: iron filings, iron balls, iron particles, iron fibers, and the like.

In some embodiments, the cell includes a ratio of bauxite residue to zero valent iron (ZVI).

In some embodiments, the ZVI is present in: not greater than about 15 wt. %; not greater than about 13 wt. %; not greater than about 11 wt. %; not greater than about 10 wt. %; not greater than about 7 wt. %; not greater than about 5 wt. %; not greater than about 3 wt. %; not greater than about 2.5 wt. %; not greater than about 1 wt. %; or not greater than about 0.5 wt, %. In some embodiments, the ZVI is present in: at least about 15 wt. %; at least about 13 wt. %; at least about 11 wt. %; at least about 10 wt. %; at least about 7 wt. %; at least about 5 wt. %; at least about 3 wt. %; at least about 2.5 wt. %; at least about 1 wt. %; or at least about 0.5 wt. %.

In some embodiments, the bauxite residue and ZVI are mixed to commingle the media. In some embodiments, the BR and ZVI are mixed to thoroughly disperse the ZVI within the BR. In some embodiments, the combined/mixed BR and ZVI is pelletized, to provide a pelletized media.

Without being bound to a particular mechanism or theory, it is believed that the pelletized media may provide an improved hydraulic conductivity through the cell by eliminating potential plugging due to degradation (rusting) of pockets of ZVI.

As used herein, "module" means: a self-contained component, which can be installed as a unit. In some embodiments, the bauxite residue cell comprises a module comprising an outer sidewall which contains (e.g. completely encases) the media therein. In some embodiments, the anaerobic tank comprises a module. In some embodiments, the engineered wetland comprises a module (e.g. tank wetland).

As used herein, "pathogen" means: a disease causing agent. Some non-limiting examples of pathogens include: bacteria (e.g. as indicated by fecal coliform, *E. coli*, fecal streptococcous), protozoa (e.g. *Giardia* and *Cryptosporidium*), and microorganisms.

As used herein, "bacteria" means: a single-celled or non-cellular spherical or spiral or rod-shaped organisms (lacking chlorophyll) that reproduce by fission.

As used herein, "anaerobic zone" means: a region which has the capability to supports anaerobic bacteria.

As used herein, "aerobic zone" means: a region which has the capability to support aerobic bacteria.

As used herein, "anoxic zone" means: a region which has the capability to support microaerophilic bacteria.

As used herein, "wastewater" means: water having impurities and/or contaminants therein. In some embodiments, wastewater includes: sanitary wastewater, industrial (or process) wastewater, storm water (e.g. run-off) and/or combinations thereof. As some non-limiting examples, wastewater treated in accordance with one or more embodiments of the instant disclosure can include the following contaminants/impurities: viruses, bacteria, protozoa, algae, oil, grease, pharmaceuticals, personal care products, ammonia, phosphorous, heavy metals (e.g. arsenic, mercury, chromium), and others.

As used herein, "cleaned water" means: water meeting the purity limits as set by regulations set by various government and/or regulatory bodies. In some embodiments, the systems and methods of the instant disclosure transform wastewater into cleaned water. In some embodiments, cleaned wastewater is discharged to a holding tank for reuse (recycle). In some embodiments, cleaned wastewater is discharged to a drainage field, into a body of water, or used for irrigation purposes.

As used herein, "dissolved oxygen" (also called DO) means: the amount of oxygen dissolved in water, measured in ppm. Oxygen saturation for a wastewater stream is dependent upon the temperature of the wastewater.

As used herein, "average particle size of media" refers to the average particle size of the media.

As used herein, "average particle diameter of media" refers to the average diameter of the media, when the media is in circular/spherical form.

As used herein, "hydraulic conductivity" means: the quantitative measure of a saturated material's ability to transmit water when subjected to a hydraulic gradient. As a non-limiting example: hydraulic conductivity is the ease with which pores of a saturated material permit water movement. In some embodiments, hydraulic conductivity is a function of the materials or the mixture of materials, and relates to the permeability characteristics of the material (e.g. particle size of the material/media). In some embodiments, hydraulic conductivity is a function of velocity and pressure drop across the media/cell.

As used herein, "hydraulic gradient" means: the difference in total hydraulic head per unit distance.

As used herein, "hydraulic loading rate" means: the rate at which the wastewater loads onto the substrate (media) and this rate may vary based on the media particle size and/or contaminant being removed. As used herein, "surface over flow rate" means the volume flow of water per hour ($m^3/hr$) as a function of the surface area of the treatment tank ($m^2$), such that surface over flow rate is measured in m/hr.

As used herein, "hydraulic retention time" means: the amount of time the water spends moving through a volume of material.

As used herein, "field capacity" (or "in situ moisture content) means: how much moisture a particulate material can hold.

As used herein, "pH in zone" means: the average pH of water in a zone (e.g. first zone, second zone, or third zone). In some embodiments, the pH in the wastewater treatment system is between about 4 and about 11. In some embodiments, the pH of the effluent is 6 to not greater than 9.

Various ones of the inventive aspects noted hereinabove may be combined to yield a wastewater treatment system or method of using such system to remove contaminants and impurities from a wastewater stream.

These and other aspects, advantages, and novel features of the invention are set forth in part in the description that follows and will become apparent to those skilled in the art upon examination of the following description and figures, or may be learned by practicing the invention.

BRIEF DESCRIPTION OF THE DRAWINGS

FIG. 2A depicts a top plan view of an embodiment of a second zone, or an engineered wetland, in accordance with the instant disclosure.

FIG. 2B depicts a side plan view of the engineered wetland of FIG. 2A.

FIG. 2C depicts a close-up cut-away side plan view of the engineered wetland of FIG. 2B.

FIGS. 6A-6C depicts various perspective side views of portions of the aeration system depicted in FIG. 5.

FIG. 9 depicts a top plan view of one embodiment of the system of the instant disclosure.

FIG. 10 depicts a cut-away side view of the embodiment of the wastewater treatment system depicted in FIG. 9.

FIG. 11B depicts a hockey stick-shaped baffle, a single member angled in the same manner as the hockey stick shaped baffle, and a settling promoter (e.g. angle baffle attached to the sidewall).

FIG. 11C depicts a hockey stick shaped baffle, two members angled in the same manner as the lower end of the hockey stick shaped baffle, and spaced equidistant from each other, with a third member located above the first two members (e.g. in the "mixing zone" and angled in an obtuse direction when compared to the plane of the bottom of the tank), and a settling promoter that is a baffle positioned in an angled direction (e.g. acute angle).

FIG. 11D depicts a hockey stick shaped baffle adjacent to the inlet, followed by two members positioned at different heights from each other relative to the depth of the tank, with a settling promoter attached to the sidewall and positioned in an obtuse angle when compared to the plane created by the bottom of the tank.

FIG. 11E depicts a hockey stick shaped baffle, a very large member (lengthwise) having a different angle than the lower portion of the hockey stick shaped baffle, where the member crosses a substantial portion of the mixing volume of the tank, and a settling promoter angled in an acute angle from the sidewall with a top portion having an angle close to 0 degrees.

FIG. 11F depicts a hockey stick shaped baffle, with two members having an angle close to 0 degrees (e.g. ~5 degrees, and spaced equidistantly from each other), with a settling promoter located on the effluent sidewall adjacent to the outlet.

FIG. 13 shows the effluent fecal coliform concentrations for each column versus time through the course of the study. The sand control column exhibited a lag in disinfection performance, as indicated by the high effluent concentration in the first six data points (to the left of the first dotted line); the remaining columns performed more consistently over the course of the pilot, exhibiting no low-removal startup period. When the flow rate was doubled, (i.e. the right side of the second dotted line) fecal coliform effluent concentration tended to increase slightly in all columns, as empty bed contact time was reduced from about 624 minutes to about 300 minutes per column.

DETAILED DESCRIPTION

The present disclosure provides systems and methods of effectively treating a wastewater stream to disinfect the water and remove other contaminants from the water. Removal of contaminants, other than microorganisms, may include the removal of ammonia, biodegradable organics (e.g. BOD, CBOD), TSS, VSS, oils, greases, phosphorus, metals, pharmaceuticals, and personal care products. Reference will now be made in detail to the accompanying drawings, which at least assist in illustrating various pertinent embodiments of the present invention.

Figure 1:
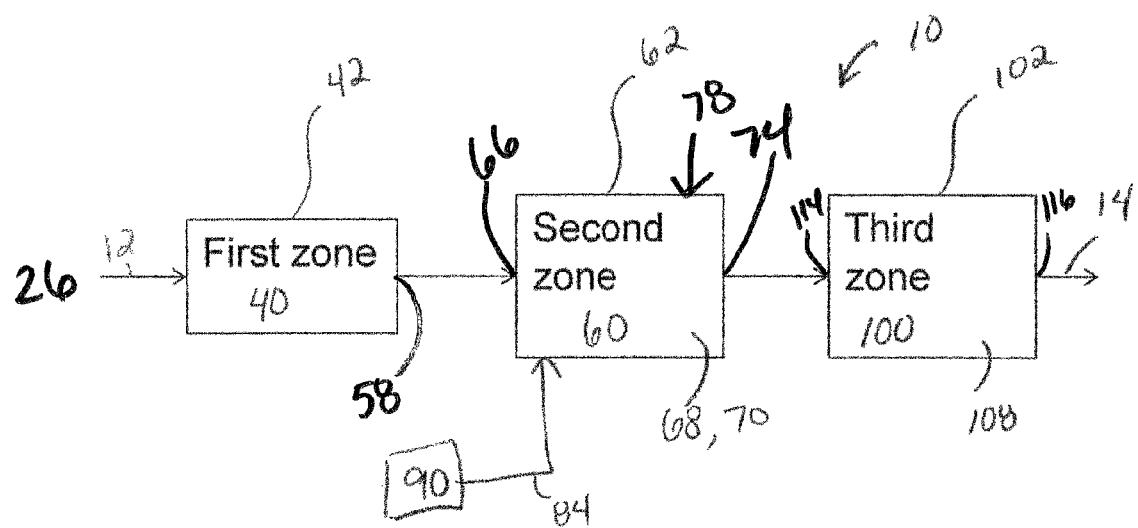
FIG. 1 depicts and flow chart of an embodiment of a wastewater treatment system in accordance with the instant disclosure.

Referring to FIG. 1, a schematic of an embodiment of the wastewater treatment system 10 of the instant disclosure is depicted. The system 10 depicts an inlet 12, an outlet 14, and a first zone 40, second zone 60, and third zone 100, which are in liquid communication with each other, as depicted via arrows between zones. Wastewater 26 is directed into the system via inlet 12.

Then, the wastewater 26 travels from the inlet 12 into the first zone 40, which is at least one anaerobic settling and treatment tank 42. The anaerobic settling/treatment tank 42 is configured to remove particulates and sludge from the wastewater and remove/reduce biodegradable organics. Next, the wastewater 26 is directed from the outlet 58 of the first zone 40 to the inlet 66 of the second zone 60, which is at least one engineered wetland 62.

The engineered wetland 62 includes media 68 and vegetation (plants) 70 retained in the wetland and/or rooted in the media 68. Also, the engineered wetland 62 is aerated via an aeration system 90 in communication with the engineered wetland 62 via piping 84. In some embodiments, the engineered wetland 62 is configured to receive organics (e.g. methanol, woodchips, molasses, etc.) from an organic feed chamber 78 (depicted, e.g. in FIG. 9). In some embodiments, the organic feed chamber 78, which is adapted to be in liquid communication with the engineered wetland 62. (see, e.g. FIG. 9, 10.) In the second zone 60, the wastewater 62 is disinfected and contaminants are removed therefrom. The wastewater 26 is then directed out of the second zone 60 via the outlet 74 and into the third zone 100 via the inlet 114.

The third zone 100 comprises at least one bauxite residue cell 102. The bauxite residue cell 102 includes media 108 therein. In some embodiments, the media 108 comprises bauxite residue. In some embodiments, the media consists essentially of bauxite residue. In some embodiments, the media 108 comprises bauxite residue and ZVI in a particular weight ratio. In some embodiments, the media 108 comprises a mixture of bauxite residue and ZVI.

In some embodiments, in the bauxite residue cell 102, the wastewater 26 is disinfected and is treated to remove (if present), as non-limiting examples, contaminants including: ammonia, phosphorous, heavy metals, pharmaceuticals, and personal care products. Cleaned water is then directed out of the bauxite residue cell 102 via outlet 116. Cleaned water then exits the system 10 via the outlet 14. In some embodiments, the outlet 116 from the bauxite residue cell 102 is the same as the outlet 14 from the wastewater treatment system.

FIGS. 2A through 3B are directed towards an embodiment of the second zone 60, at least one engineered wetland 62. Referring to FIGS. 2A-2C, wastewater 26 enters the wetland 62 via inlet 66, and is aerated by air directed into the engineered wetland via piping 84, which is located along the bottom portion of the vessel 64. While wastewater 26 is retained in and travels through the wetland 62, it is aerated via air coming through the piping 84 and it is directed through the media 68 and plant roots of the plants rooted in the media 68.

Figure 3A:
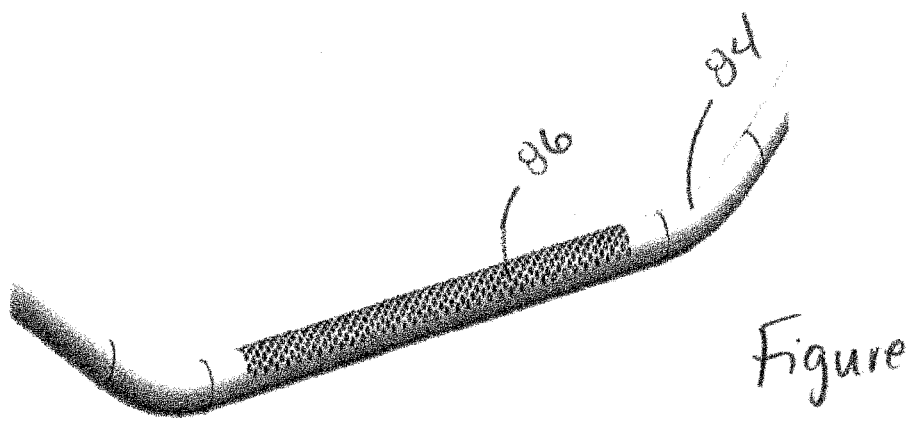
FIG. 3A depicts an embodiment of a perforated aeration pipe usable in accordance with an embodiment of a second zone of the instant disclosure.
Figure 3B:
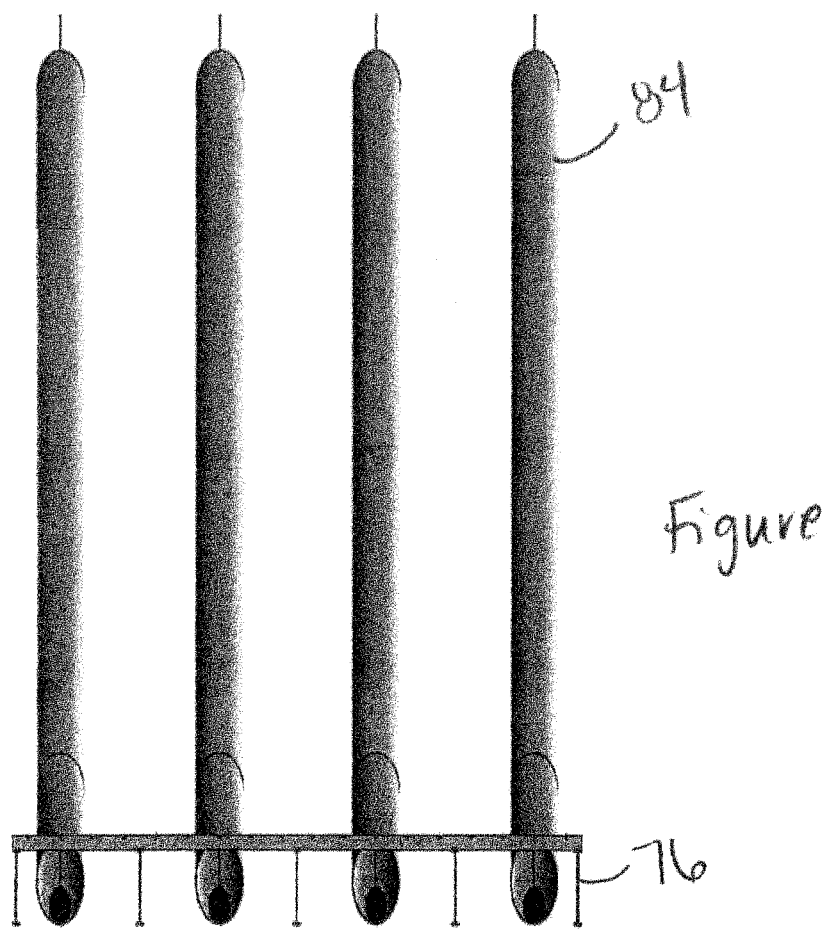
FIG. 3B depicts an embodiment of an aeration system of an engineered wetland, including several aerations lines anchored via grating (e.g. grating supports).

Referring to the aeration system 90, the piping 84 is located along the bottom portion of the wetland 62, and is configured with a plurality of perforations to distribute air into the wastewater 26. Diffusers 88 cover the perforations in the piping 84 and are configured to diffuse the gaseous air into the wastewater 26. A grate 76 (including the grate and support) supports the piping 84 to prevent the media 68 from crushing the piping 84. FIG. 3A shows a close-up of a curved portion of piping 84 having perforations 86 therein. FIG. 3B depicts the portions of piping 84 anchored via grate 76 into the bottom of the vessel 64.

Figure 4:
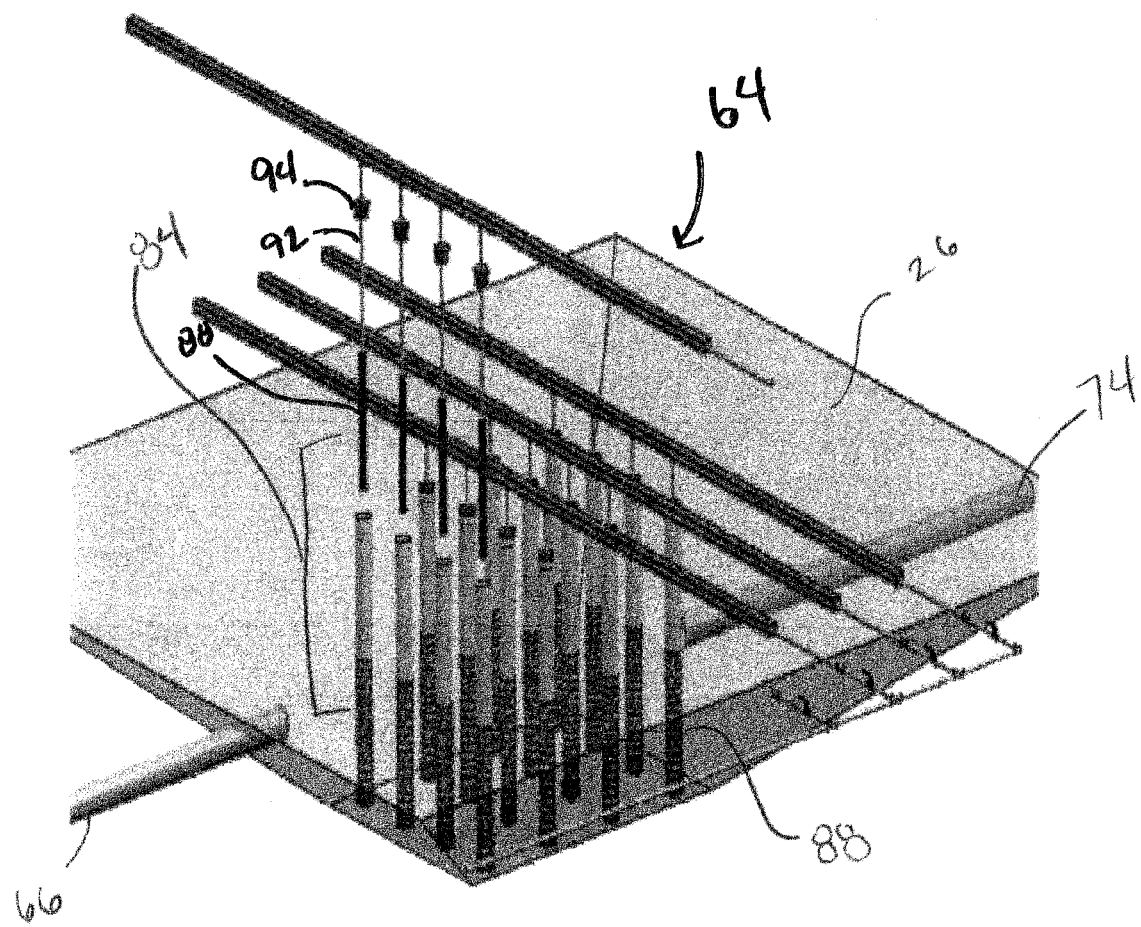
FIG. 4 depicts a cut-away perspective view of an embodiment of a portion of an aeration system in a second zone of a wastewater treatment system in accordance with the instant disclosure.
Figure 5:
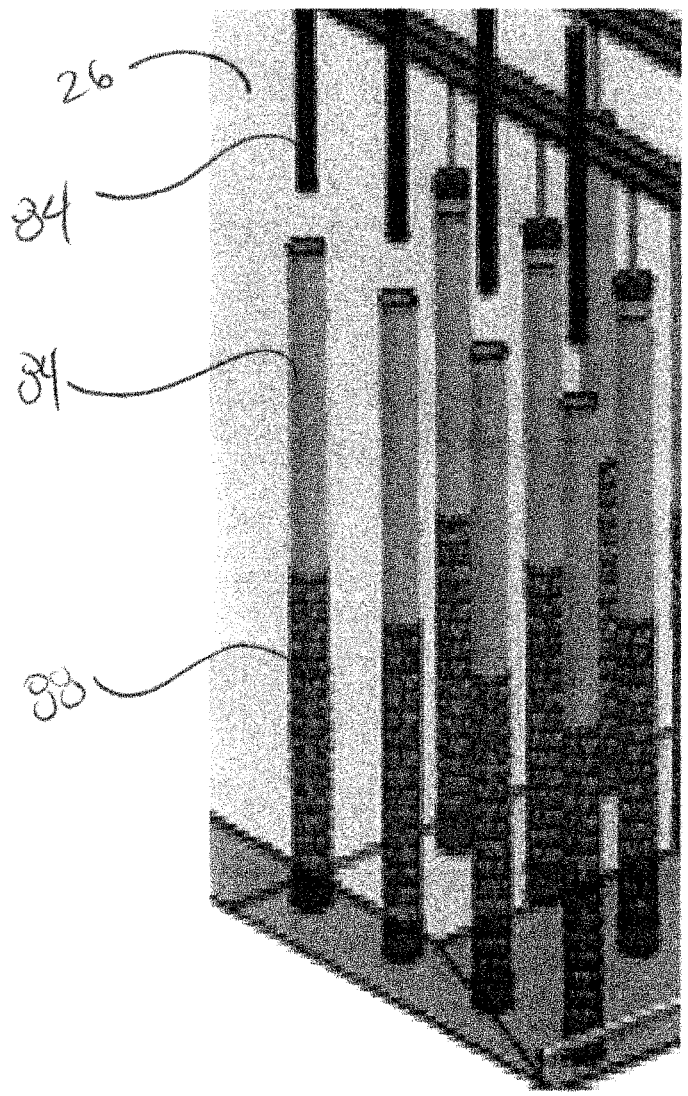
FIG. 5 depicts a close-up cut away perspective view of the embodiment depicted in FIG. 4.

Referring to FIGS. 4-6C, another embodiment of an engineered wetland 62 is depicted. As shown in FIGS. 4 and 5, the configuration of the vessel 64, inlet 66 and outlet 74 are similar, while the aeration system 90, including the piping 84 and diffusers 88, are in a different configuration. Here, the piping 84 is directed across the top of the vessel 64, with individual aeration lines which are retained into secondary pipes 92. The secondary pipes 92 are connected to the piping 84 via plugs 94 to prevent water from flowing into the secondary pipes 92 and pipes 84. In some embodiments, the pipes 84 are removable and/or the incoming air supply/level of aeration is variable to adjust the amount of aeration in the wetland. FIGS. 6A, 6B, and 6C each depict close-up perspective views of the drop down aeration lines stemming from the piping 84.

Figure 7A:
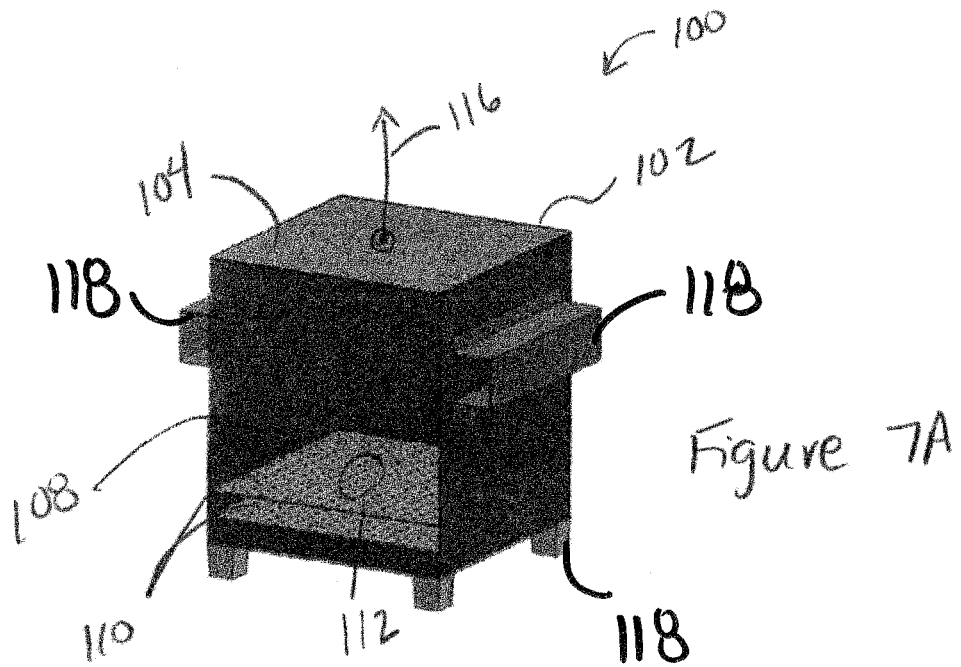
FIG. 7A depicts an embodiment of a third zone (e.g. bauxite residue cell) in accordance with the instant disclosure.
Figure 7B:
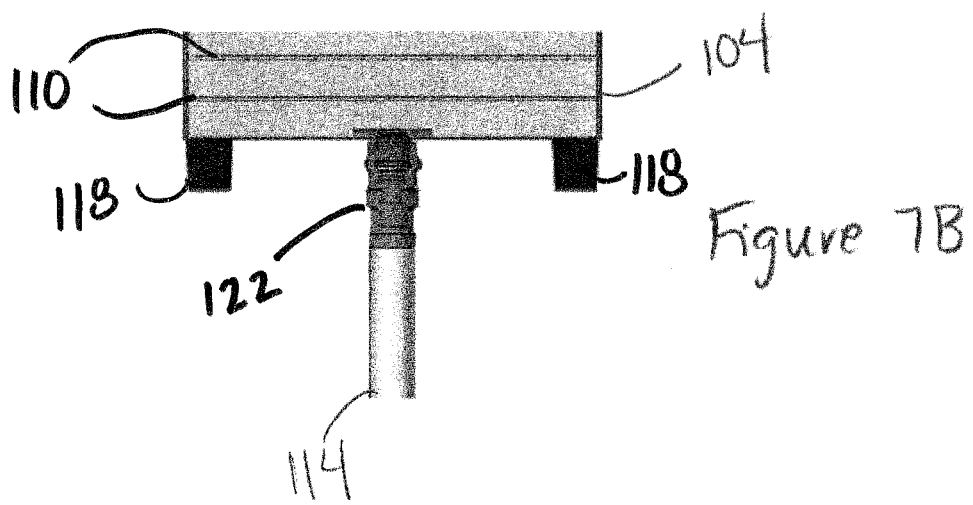
FIG. 7B depicts a cut away side view of an embodiment of a bottom portion of the third zone (e.g. bauxite residue cell) of FIG. 7A.

FIGS. 7A and 7B depict an embodiment of the third zone, comprising at least one bauxite residue cell 102. Referring to FIGS. 7A and 7B, a modular bauxite residue cell is depicted. In some embodiments, the sidewall of the module completely encases the inner void of the bauxite residue cell 102, where the media 108 is housed. Wastewater 26 is directed into and out of the cell 102 via inlet and outlet, which are in liquid communication with the inner void. In some embodiments, the cell 102 is equipped with supports (e.g. on each side) to enable the module to be moved/adjusted. In some embodiments, supports comprise wheels, a wheel and track configuration, a stand (e.g. which allows for a lift to move/remove the cell 102), and combinations thereof. Referring to FIG. 7A, the bauxite residue cell 102 includes distributor plates (e.g. baffles) 110 towards the bottom portion of the cell 102, where each distributor plate 110 includes perforations therein 112 to permit wastewater 26 to flow there through. In some embodiments, the distributor plates are configured to disperse wastewater as it enters the bauxite residue cell via the inlet 114. In some embodiments, the distributor plates are off-set from each other such that the perforations do not line up. FIG. 7B depicts the inlet 114 at the base of the cell 102 vessel 104, illustrating that this embodiment is for an up-flow configuration (e.g. reverse gravity). Also depicted in FIG. 7B is the connection port 122, which is configured to allow for a quick connect/disconnect of the bauxite residue cell module from the inlet 114 and outlet 116 (e.g. so that another module can replace it).

Figure 8:
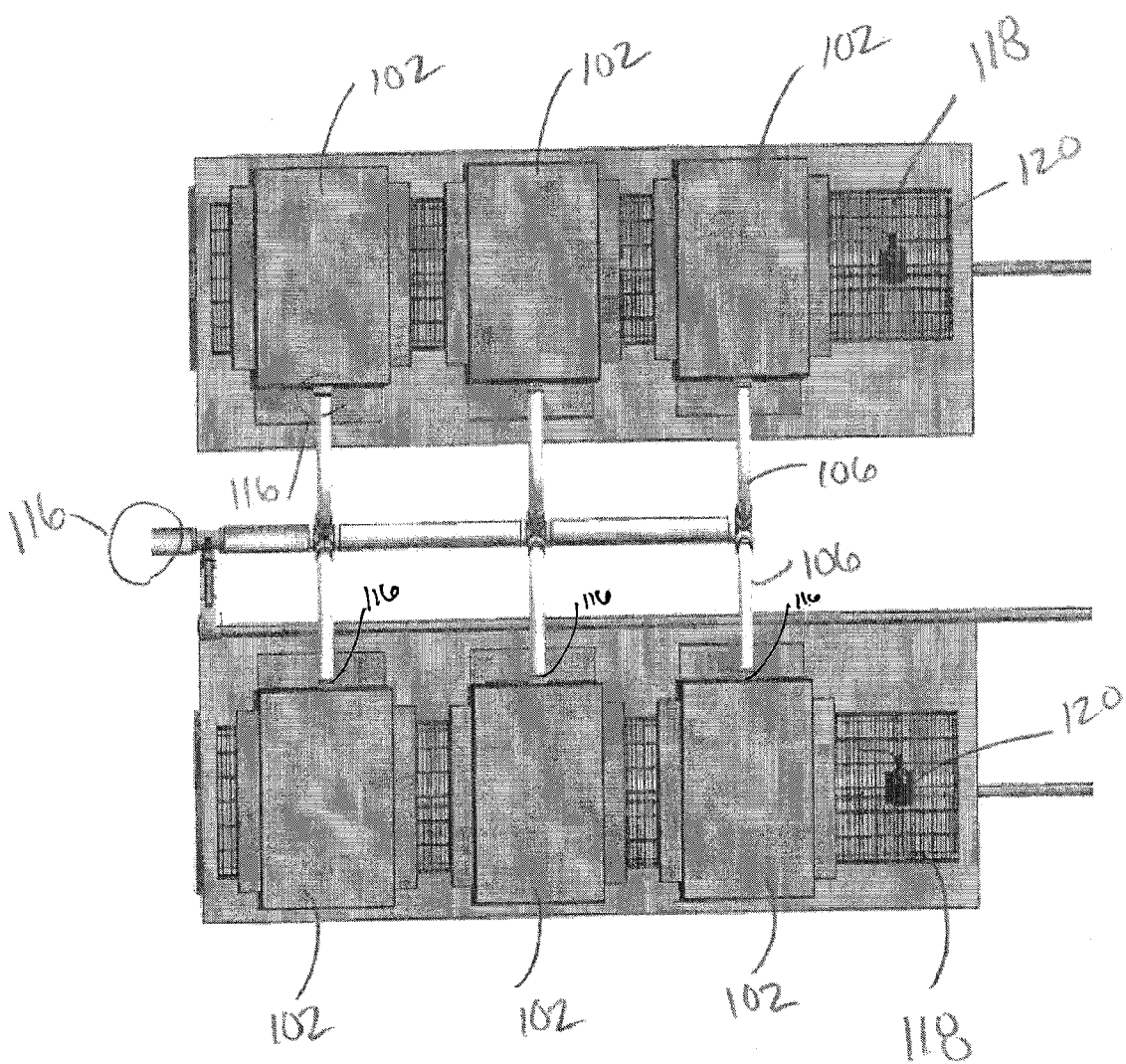
FIG. 8 depicts a top plan view of an embodiment of the third zone of the instant disclosure, including a plurality of bauxite residue cells configured in parallel to one another and connected to receive wastewater and disperse cleaned water.
Figure 11A:
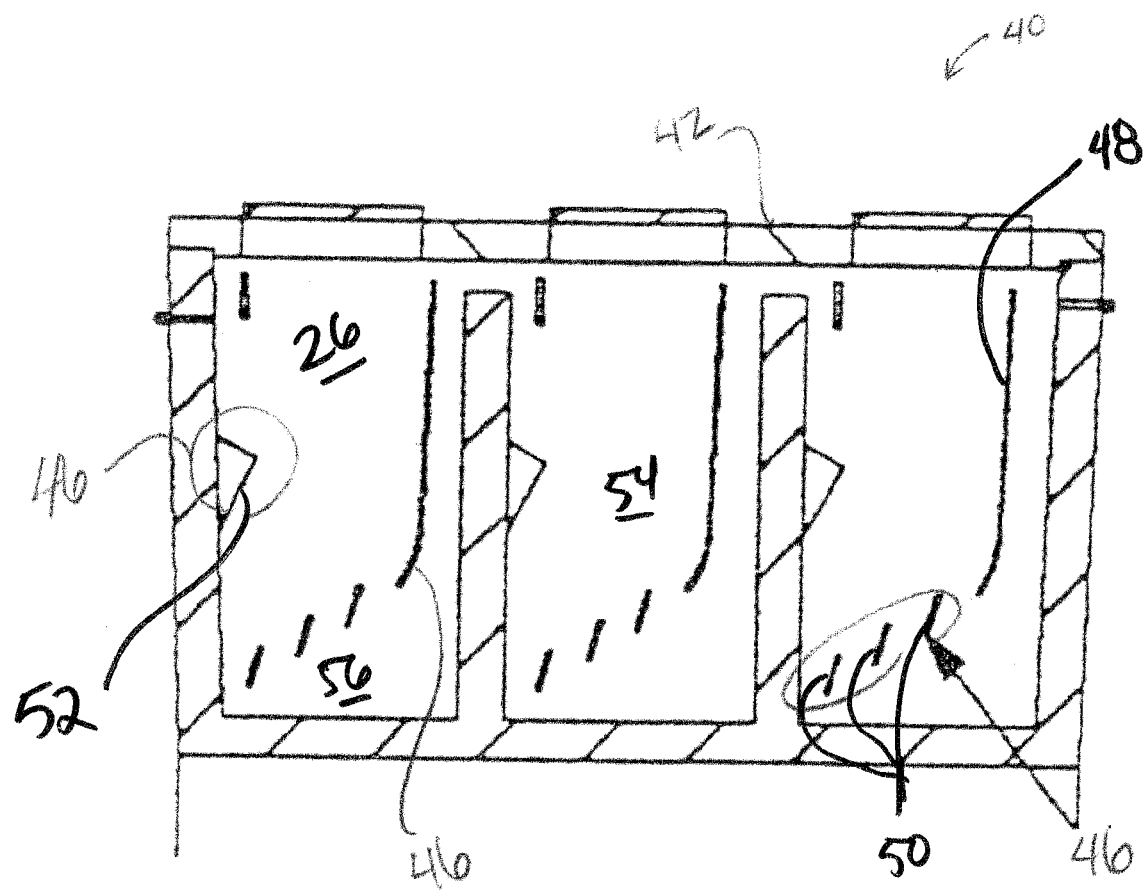
FIG. 11A depicts a cut-away side view an embodiment of an anaerobic settling tank in accordance with the instant disclosure (e.g. referenced as Tank 3 in the Examples section)
Figure 11D:
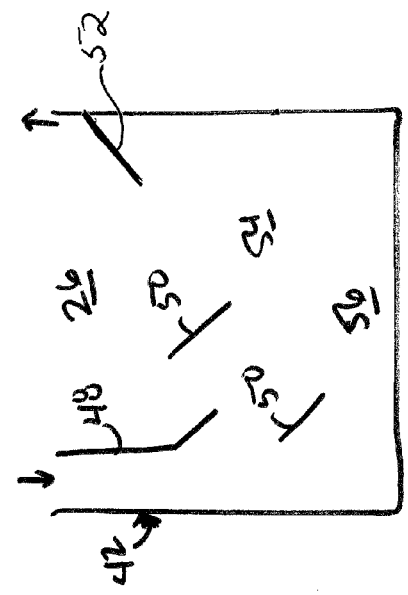
FIGS. 11B through 11G depict alternative embodiments of the baffle configuration of the anaerobic settling and treatment tank in accordance with the instant disclosure.
Figure 11C:
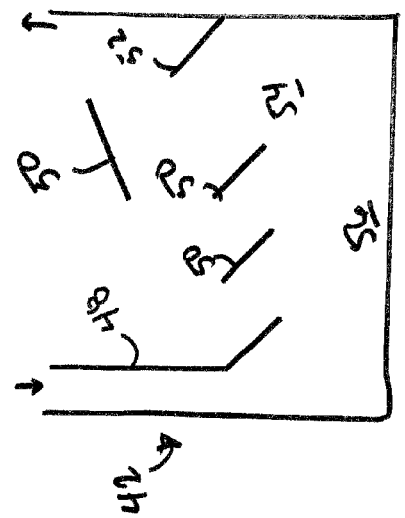
Figure 11B:
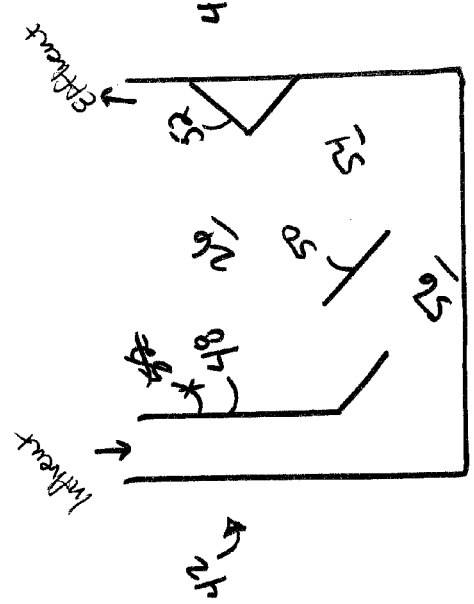
Figure 11G:
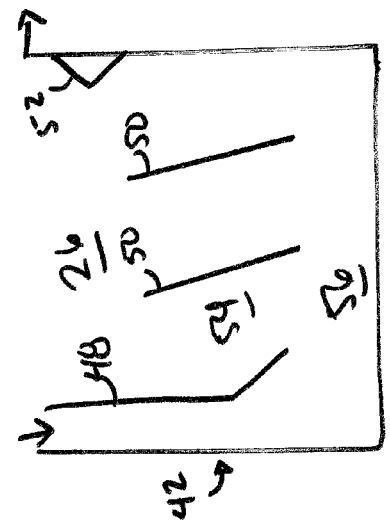
Figure 11F:
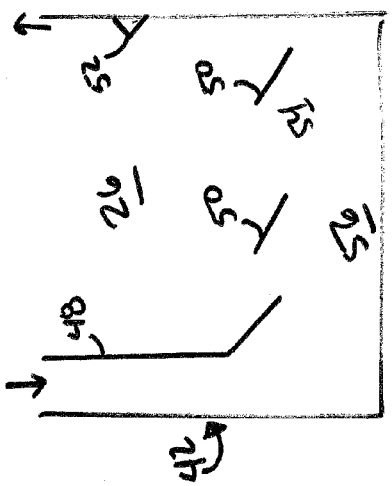
Figure 11E:
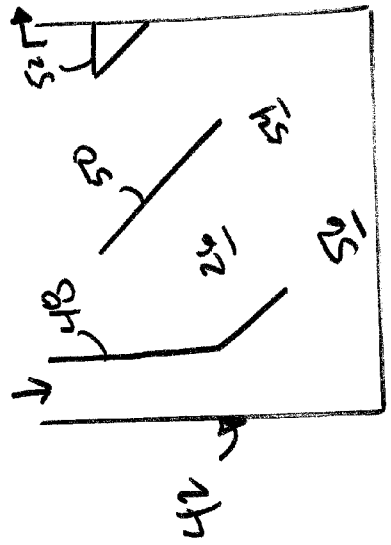

Referring to FIG. 8, a plurality of bauxite residue cells 102 are arranged in parallel to one another on top of a support 118 to enable wastewater 26 to be fed from an inlet 114 at the base of each module (see, e.g. FIG. 7B). Further, a pump 120 is depicted, for pumping the wastewater 26 in an up-flow configuration. Once the water is cleaned, it exits the cells 102 via piping and is directed to the outlet 116 of the third zone of the bauxite residue cell/module system.

Without being bound to a particular mechanism or theory, the function of the anaerobic settling tank (e.g. septic tank) is believed to be the breaking down/removal of organic matter by anaerobic bacteria contained in the tank sludge. Settling of suspended solids, organic and inorganic solids are removed in this first zone.

Without being bound by a particular mechanism or theory, it is believed that the function of engineered wetland A is for additional removal of BOD, using aerobic bacteria (e.g. the wetland is aerated) and to provide nitrification (conversion of ammonia to nitrate), via the aerobic bacteria. Without being bound to a particular mechanism or theory, the function of the engineered wetland portion of the treatment is believed to be BOD removal, nitrification/denitrification, and additional TSS removal from the wastewater.

EXAMPLE 1

Example of a Wastewater Treatment System

Referring to FIGS. 9 and 10, schematics for an embodiment of a wastewater treatment system is depicted. This schematic was constructed and operated as a pilot for this Example. In each tank (three shown), the design HRT is 0.25 to 1 day at an influent flow rate.

Within each tank, there is an upflow region and a down flow region. Each tank contains 3 chambers (1 chamber consisting of a down flow section followed by an up flow section). The separate chambers and baffles direct the flow of water, allowing for better contact between the wastewater and the anaerobic bacteria in the sludge (i.e. high concentration sludge zone located proximate to the bottom of the tank.) The up flow chambers are sized so that the up flow velocity is 0.25 m/hr at an influent flow rate of 1 gpm.

Tank 1&2 each contain a baffle configuration which is a 'hockey stick' design (i.e. two baffles, each with a generally straight portion and each straight portion having an angled section at its end). Tanks 1&2 are piped in series, so that the effluent from Tank 1 is the influent to Tank 2, testing removal efficiency of 6 total chambers.

Referring to FIG. 11, Tank 3 is depicted, which includes a baffle configuration including a hockey stick-shaped baffle, three members (vane baffles) and a settling promoter (e.g. located on the sidewall closest to the outlet). The baffle configuration was based upon computer modeling experiments (see, e.g. Example 5). This tank has 3 different types of baffles that cooperate as one structure. The suspended baffle is closest to the inlet and is configured to separate the down flow from the up flow section. The suspended baffle comprises a hockey-stick shape, with a straight portion (e.g. generally vertical, perpendicular to the bottom of the tank) and a bottom portion which is curved. Also, there are three separate members that are configured to act as turning vane baffles. The members direct the path of water downward to promote the settling of solids and the mixing of water in the tank (e.g. prevent short circuiting). Next, there is a settling promoter (e.g. prism shaped baffle) configured to promote current density throughout the tank. The settling promoter is configured to direct the flow of water to the center of the up flow chamber (e.g. in a uniform manner). This baffle design is depicted in greater detail in FIG. 11.

Referring to FIGS. 9 and 10, each engineered wetland tank contains a different media, where the depth of the media within each wetland is approximately four feet deep. Also, each engineered wetland is configured accept aeration from an aeration system (or portions thereof) which extends beneath (under) the media towards the bottom portion of the engineered wetland. Each wetland includes two types of aeration systems: an aquarium tubing-based aeration system and a diffuser tubing-based aquarium system. Each engineered wetland is designed for 1 day HRT under normal operating conditions.

Engineered wetland 1A includes plastic media in an elongated ring shape (e.g. BioRings™) (SA=32 ft$^2$/ft$^3$). Engineered wetland 1A houses the control aquarium tubing aeration system, and ten (10) fine bubble diffusers which are 20 inches long.

Engineered wetland 2A includes lava rocks (porous rock) as the media, with an average size 1"-2". Wetland 2A includes the aquarium tubing aeration system, and eight sections of weighted bubble tubing which are each 69" in length. The aeration tubing includes a fiberglass grating which rests on concrete blocks to prevent the media from causing the aeration tubing.

Wetland 3A includes ASTM No 3 stone (aggregate) as the media, with an average size of 1"-2". Wetland 3A contains the control aquarium tubing aeration system, and eight weighted bubble tubing which are each 69" in length. The aeration tubing includes a stainless steel wire mesh which rests on concrete blocks to prevent the media from causing the aeration tubing.

In wetland B, each tank in this portion is divided into two sections, and water flows sequentially through each sections. The function of the first section is denitrification (i.e. conversion of nitrate to nitrogen gas by anaerobic and/or anoxic bacteria). The first section includes a carbon source (e.g. molasses, methanol, wood chips) to 'feed' the bacteria. The function of the second chamber is additional aeration and removal of any residual BOD from the carbon source added in the first chamber. The second chamber contains a growth media for bacteria to grow on (e.g. and for plants, cattails to root in) and is aerated (e.g. configured to an aeration device).

Engineered wetland 1B includes wood chips as the carbon source in section 1 and contains BioRings as the media in section 2. The aeration system in section 2 includes both aquarium tubing, and eight sections of weighted bubble tubing which are each 47" in length.

Engineered wetland 2B includes rocks as the media in section 1. Prior to entering section 1, the influent will be mixed (e.g. in line) with a water/molasses mixture (e.g. at low concentration) as the carbon source. Engineered wetland 2B includes No 3 stone media in section 2 and the aeration system in section 2 includes both aquarium tubing, and nine weighted bubble tubing sections which are each 47" in length. A stainless steel wire mesh rests on concrete blocks to protect the aeration tubing (e.g. from the weight of the media). Without being bound to particular mechanism or theory, the mixed metal oxide cell (e.g. bauxite residue cell) is believed to function to provide (if needed) final polishing (TSS removal) and disinfection (pathogen removal, e.g. indicated via fecal coliform, *e. coli* removal) to the wastewater, resulting in cleaned water. The cell will use two separate modules. One module includes bauxite residue (e.g. alkaline clay) "as received" from the storage facility. The other module includes bauxite residue with 2.5 wt. % ZVI in pelletized form (e.g. pellets).

The following tables provide data obtained via the pilot system.

|  | Conventional Baffle | | | Baffle Configuration | | |
| --- | --- | --- | --- | --- | --- | --- |
|  | Min % removal | Avg. % removal | Max % removal | Min % removal | Avg. % removal | Max % removal |
| Total COD | 39 | 72 | 94 | 42 | 75 | 96 |
| BOD5 | 74 | 86 | 97 | 77 | 88 | 99 |
| NH3—N | — | 33 | 62 | — | 34 | 75 |
| NO3—N | — | 77 | 95 | — | 72 | 91 |
| PO4 | — | 58 | 65 | — | 70 | 72 |
| TSS | — | 92 | 97 | — | 90 | 98 |
| VSS | — | 92 | 97 | — | 91 | 99 |

| Wetland Influent | | | |
| --- | --- | --- | --- |
| | Min | Max | Avg. |
| Total COD | 48 | 395 | 292 |
| Soluble COD | 30 | 179 | 90 |
| BOD 5 | 29 | 759 | 170 |
| NH3—N | 13 | 48 | 28 | values in mg/L

| | Wetland 1A | | | Wetland 2A | | | Wetland 3A | | |
| --- | --- | --- | --- | --- | --- | --- | --- | --- | --- |
| | Min | Max | Avg | Min | Max | Avg | Min | Max | Avg |
| Total COD | 35 | 92 | 54 | 12 | 58 | 30 | 11 | 70 | 36 |
| Soluble COD | 20 | 66 | 39 | 8 | 51 | 24 | 2 | 50 | 25 |
| BOD 5 | 6 | 7 | 6.5 | 3 | 3 | 3 | n/a | n/a | n/a |
| NH3—N | 2.2 | 44 | 15 | 0.15 | 25 | 8.5 | 0.32 | 40 | 17 | values in mg/L

In some embodiments, the hydraulic loading rate of the anaerobic settling/treatment tank is at least about 0.008 gal/min/ft$^2$ to not greater than about 0.143 gal/min/ft$^2$.

In some embodiments, the hydraulic loading rate of the anaerobic tank is: at least 0.01 gal/min/ft$^2$; at least 0.025 gal/min/ft$^2$; at least 0.05 gal/min/ft$^2$; at least 0.075 gal/min/ft$^2$; at least 0.1 gal/min/ft$^2$; at least 0.125 gal/min/ft$^2$; at least about 0.140 gal/min/ft$^2$.

In some embodiments, the hydraulic loading rate of the anaerobic tank is: not greater than 0.01 gal/min/ft$^2$; not greater than 0.025 gal/min/ft$^2$; not greater than 0.05 gal/min/ft$^2$; not greater than 0.075 gal/min/ft$^2$; not greater than 0.1 gal/min/ft$^2$; not greater than 0.125 gal/min/ft$^2$; not greater than about 0.140 gal/min/ft$^2$.

In some embodiments, the hydraulic loading rate of the engineered wetland is at least about 0.002 to about 0.072 gal/min/ft$^2$.

In some embodiments, the hydraulic loading rate of the wetland is: at least 0.002 gal/min/ft$^2$; at least 0.005 gal/min/ft$^2$; at least 0.01 gal/min/ft$^2$; at least 0.03 gal/min/ft$^2$; at least 0.05 gal/min/ft$^2$; or at least 0.07 gal/min/ft$^2$.

In some embodiments, the hydraulic loading rate of the wetland is: not greater than 0.002 gal/min/ft$^2$; not greater than 0.005 gal/min/ft$^2$; not greater than 0.01 gal/min/ft$^2$; not greater than 0.03 gal/min/ft$^2$; not greater than 0.05 gal/min/ft$^2$; or not greater than 0.07 gal/min/ft$^2$.

In some embodiments, the hydraulic loading rate of the mixed metal oxide media cell is at least about 0.011 gal·min/ft$^2$ to not greater than about 0.444 gal/min/ft$^2$.

In some embodiments, the hydraulic loading rate of the BR cell is: at least 0.05 gal/min/ft$^2$; at least 0.1 gal/min/ft$^2$; at least 0.2 gal/min/ft$^2$; at least 0.3 gal/min/ft$^2$; or at least 0.4 gal/min/ft$^2$.

In some embodiments, the hydraulic loading rate of the BR cell is: not greater than 0.05 gal/min/ft$^2$; not greater than 0.1 gal/min/ft$^2$; not greater than 0.2 gal/min/ft$^2$; not greater than 0.3 gal/min/ft$^2$; or not greater than 0.4 gal/min/ft$^2$.

In some embodiments, the flow rate of water into the system is at least about 1 gpm to about 10 gpm. In some embodiments, the flow rate of water into the system is: at least 2 gpm; at least 4 gpm; at least 6 gpm; or at least 8 gpm. In some embodiments, the flow rate of wastewater into the system is not greater than 2 gpm; not greater than 4 gpm; not greater than 6 gpm; or not greater than 8 gpm.

In some embodiments, the hydraulic conductivity of the mixed metal oxide cell is at least about 0.0009 cm/s to not greater than about 0.19 cm/s.

In some embodiments, the hydraulic conductivity of the pelletized media in the mixed metal oxide cell is: at least about $10^{-1}$ cm/s to about $10^{-4}$ cm/s.

In some embodiments, the porosity of the engineered wetland is at least about 35% (e.g. aggregate) to not greater than about 95% (e.g. plastic media or hollow cylindrical form).

In some embodiments, the field capacity of the mixed metal oxide media cell is at least about 50% to not greater than about 60%.

In some embodiments, the anaerobic settling/treatment tank is configured to remove at least about 50% to not greater than about 99% of BOD/COD from a wastewater stream.

In some embodiments, the engineered wetland is configured to remove at least about 40% to not greater than about 99.9% of pathogens (e.g. indicated by fecal coliform).

In some embodiments, the mixed metal oxide medial bed is configured to remove at least about 60% to not greater than about 100% (e.g. below detection limit) of pathogens (e.g. indicated by fecal coliform).

In some embodiments, the mixed metal oxide media bed is configured to remove at least about 30% to not greater than about 99% of pharmaceuticals and personal care products.

EXAMPLE 2

Column Study

A pilot was run to test bauxite residue and ZVI media disinfection. Five columns were constructed, and each was 30-inches tall with a 4-inch diameter. The column influent water was pumped from a front portion of an existing wastewater treatment system (wastewater had solids removed via a septic system, but had otherwise undergone limited, if any, treatment).

Each column contained a different media, including: sand (control), BR only, BR with 2.5 wt % ZVI; two columns, BR with 2.5 wt % ZVI and sand with 2.5 wt % ZVI, each had a compost pretreatment column to remove dissolved oxygen from the influent water. Without being bound to a particular mechanism of theory, it is believed that by adding a small amount of ZVI to the BR media, wastewater disinfection would be enhanced without reducing the hydraulic conductivity of the column (e.g. due to accumulation of iron oxides in the filter bed).

The columns were constructed to operate in up-flow mode. Each column contained 6.35 cm (2.5 inches) of gravel on the bottom to ensure the influent water dispersed evenly throughout the column. After the gravel was placed, 76.2 cm (30 inches) of media was put into the column. The top of the column was connected to a smaller column, where the pH, dissolved oxygen, and temperature were measured with a Fischer Scientific Accument AP63 pH Probe, and a Hach HQ40d Dual-Input Multi-Parameter Digital Meter LD0101 Dissolved Oxygen/Temperature Probe. The columns were run for a 151 day period from spring through fall in an outdoor setting.

Figures 12A, 12B:
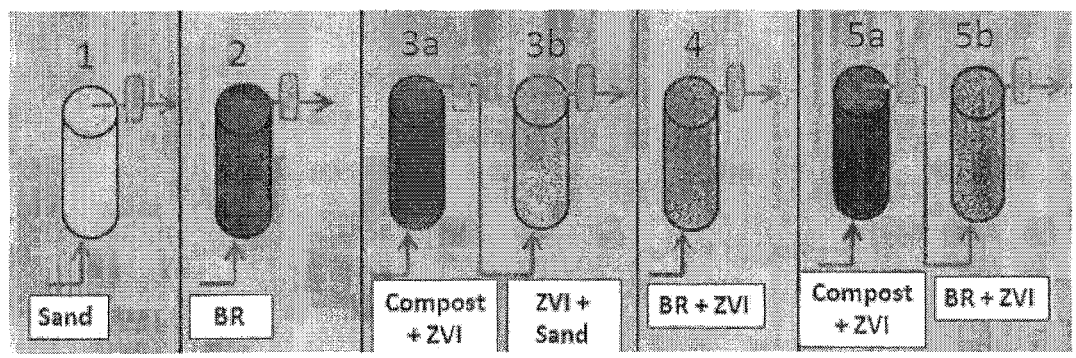
FIG. 12A depicts a series of columns having different media which were run in accordance with an experimental example.
FIG. 12B depicts the measured characteristics of each column, including porosity, empty bed contact time (EMCT), and hydraulic retention time (HRT).

In the pilot-scale BR and ZVI disinfection columns, the BR and ZVI columns removed pathogens (e.g. indicated via fecal coliform) more effectively than the control (sand) column. The data showed that the column containing 2.5 wt % ZVI performed better than the BR only column, but analysis of the data showed no statistically significant difference was achieved by adding the ZVI. Without being bound to a particular mechanism or theory, since it consistently outperformed sand, BR's mechanism of action is thought to be a combination of filtration and another mechanism;

The five (5) disinfection media scenarios run in seven (7) columns are illustrated in FIG. 12A. The first column was a control, containing only sand. The second column contained BR only. The third scenario consisted of a pretreatment column containing spent mushroom compost with 2.5 wt % ZVI, followed by a column containing sand with 2.5 wt % ZVI (i.e. this scenario had two columns in series). The fourth column contained bauxite residue with 2.5 wt % ZVI. The fifth scenario consisted of a pretreatment column containing spent mushroom compost with 2.5 wt % ZVI followed by a column containing bauxite residue with 2.5% ZVI (i.e. this scenario had two columns in series). The bauxite residue was taken from a Residue Storage Area in Texas, USA.

Figure 13:
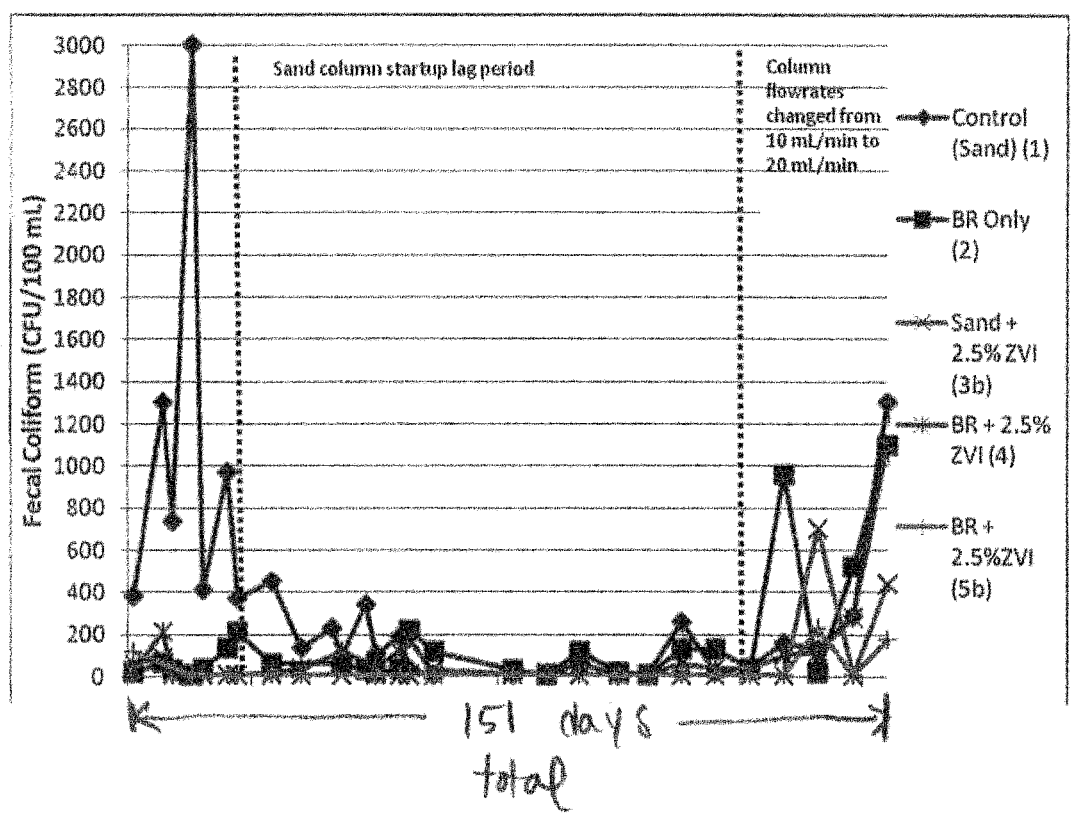
FIG. 13 is a graphical result of the measured effluent fecal coliform over time for the five different column experiments depicted in FIG. 12A over a span of 151 days, where the measure fecal coliform is an indicator of pathogen presence/pathogen removal.

The flow rate to all of the columns was 10 mL/min, with an empty bed contact time of 624 minutes; the flow rate to the columns was increased to 20 mL/min towards the end of the test, as indicated in FIG. 13. After the increase in flow rate, the empty bed contact time was reduced to about 300 minutes. The hydraulic residence time varied with the porosity of the various media, and ranged from 3.8 hours for column 5b with bauxite residue and ZVI, to 5.1 hours for columns 3a and 5a with spent mushroom compost and ZVI, as shown in FIG. 12B.

Fecal coliform (FC) concentration was the focus of the data analysis for the pilot columns. Other parameters, including dissolved oxygen, oxidation reduction potential, chemical oxygen demand, total organic carbon, nitrate, ammonia, and phosphate were also monitored; however, FC concentration showed no correlation with any of these data. Concentration of dissolved ferric and ferrous iron in column effluents were also analyzed; however, most results were below method detection limit.

The effluent from each column was generally sampled twice/week for three months. The table below summarizes the analytical methods used for analyzing the samples during this period. Prior to day 50, only one influent sample was taken, generally at column 4 (BR+ZVI), and it was assumed that other influents were the same since they were taken from the same source; however, the influent FC concentrations for each column were starting on day 50, individual fecal coliform samples were taken at the influent to each column. For the next two and a half months, columns were sampled once per week for influent and effluent FC concentration.

| Parameter | Analytical Method or Instrument Used |
| --- | --- |
| Pressure | Pressure Gage (Inches of Water) |
| pH | Fischer Scientific Accument AP63 pH Probe |
| Dissolved Oxygen | Hach HQ40d Dual-Input Multi-Parameter Digital Meter LD0101 Dissolved Oxygen/Temperature Probe |
| Temperature | Hach HQ40d Dual-Input Multi-Parameter Digital Meter LD0101 Dissolved Oxygen/Temperature Probe |
| Chemical Oxygen Demand | Method 8000 Reactor Digestion Method |
| Nitrate | EPA 300.0 ($1^{st}$ two weeks of pilot operation) Cadminum Reduction Method (after $1^{st}$ two weeks of pilot operation) |
| Ortho-Phosphate | EPA 300.0 ($1^{st}$ two weeks of pilot operation) PhosVer3 (Ascorbic Acid) Method (after $1^{st}$ two weeks of pilot operation) |
| Ammonia | 4500 NH3—N—C 20th Edition ($1^{st}$ two weeks of pilot operation) Salicylate Method (after $1^{st}$ two weeks of pilot operation) |
| ICP Metals Scan | Inductively Coupled Plasma |
| Fecal Coliform | Standard Method 9222D Membrane Filtration |
| Total Iron | EPA Method 6010B |
| Ferric Iron | Standard Method 3500-Fe B (Phenanthroline Method) |
| Ferrous Iron | Standard Method 3500-Fe B (Phenanthroline Method) |
| Dissolved Iron | Inductively Coupled Plasma |
| Total Organic Carbon | USEPA SW-846 III Ed., Method 9060 |

Pilot Study Parameters Measured and Analytical Methods Used

FIG. 13 below shows the effluent FC concentrations for each column versus time through the course of the study. During the first 6 weeks of monitoring, an effluent sample was taken at each column, but only one sample was taken at the influent and assumed to be the same for all columns. After week 4, samples were taken at the influent and effluent of each column, and it was discovered that FC concentration varied between the columns. Because influent concentrations for each column were not sampled for the duration of the experiment, effluent FC concentration was the focus of the data analysis, though average percent removal was examined. Average FC influent concentration was approximately 5000 CFU/100 mL. The sand control column exhibited a lag in performance, as indicated in FIG. 13; the remaining columns performed more consistently over the course of the pilot. When the flow rate was doubled (as indicated by the dashed vertical line on the graph), FC effluent concentration tended to increase slightly, as empty bed contact time was reduced from about 600 minutes to about 300 minutes per column.

The right-most bars in FIG. 14 below shows each column's effluent concentration, averaged over the course of the pilot study. The columns with a compost pretreatment step consisting of two columns in series were considered a single entity, with the influent as the influent to the "A" compost column, and the effluent as the effluent from the "B" sand, BR, or ZVI media column. The method detection limit for FC concentration was 10 CFU/100 mL, and results below the detection limit were reported as <10; in the following analysis, any values reported <10 were assumed to be 5 CFU/100 mL.

Looking at all the data, the control sand column had the highest average FC effluent; this high concentration may be because the sand column exhibited a lag in performance for several weeks as indicated in FIG. 13. The columns with compost pretreatment performed slightly better than the single columns, most likely because they had a hydraulic residence time approximately double that of the single columns. Much of the data for the columns with compost pretreatment was below detection limit.

The BR+2.5% ZVI column had lower effluent concentration than the BR only column, and the BR+2.5% ZVI column with compost pretreatment had lower effluent concentration than the sand+2.5% ZVI with compost pretreatment column; these results indicate not only that BR improves disinfection compared to sand, but also that the addition of ZVI seems to enhance BR disinfection.

Figure 14:
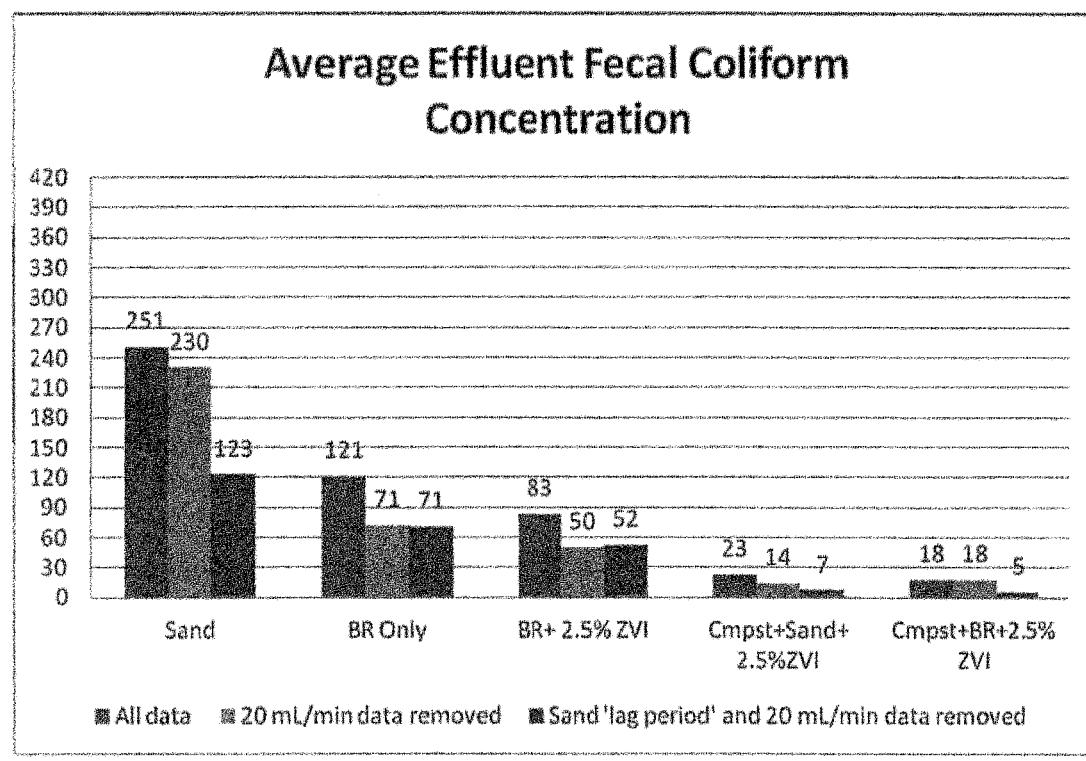
FIG. 14 is a graphical result depicting the average effluent fecal coliform at various concentrations (e.g. all data, 20 mL/min, and 10 mL/min (with sand lag removed), where fecal coliform values are indicators for pathogen contaminants.

Referring to FIG. 14, the graph depicts the average pathogen effluent concentration (indicated by fecal coliform, where the influent average is 5030 CFU/100 mL).

The centered bars for each column in FIG. 14 show the average FC effluent concentration with data from the sand column startup period and the 20 mL/min flowrate period removed. Data from the first 30 days of monitoring (typical sand filter startup period) and the last 42 days of monitoring were removed from the set. Even accounting for the sand column startup period, all columns showed lower average effluent FC concentration The right-most bars in FIG. 14 show the average effluent FC concentration with only data from the last 42 days of monitoring, the 20 mL/min period, removed. The center columns show that the columns containing sand were affected by the startup period, having effluent concentration higher than the red bars. The columns not containing sand performed about the same when data from the startup period was and was not included. The BR+2.5% ZVI column with compost pretreatment did not seem to follow this trend; however, most data points were at or below detection limit except for one high value that may have skewed the results.

Figure 15:
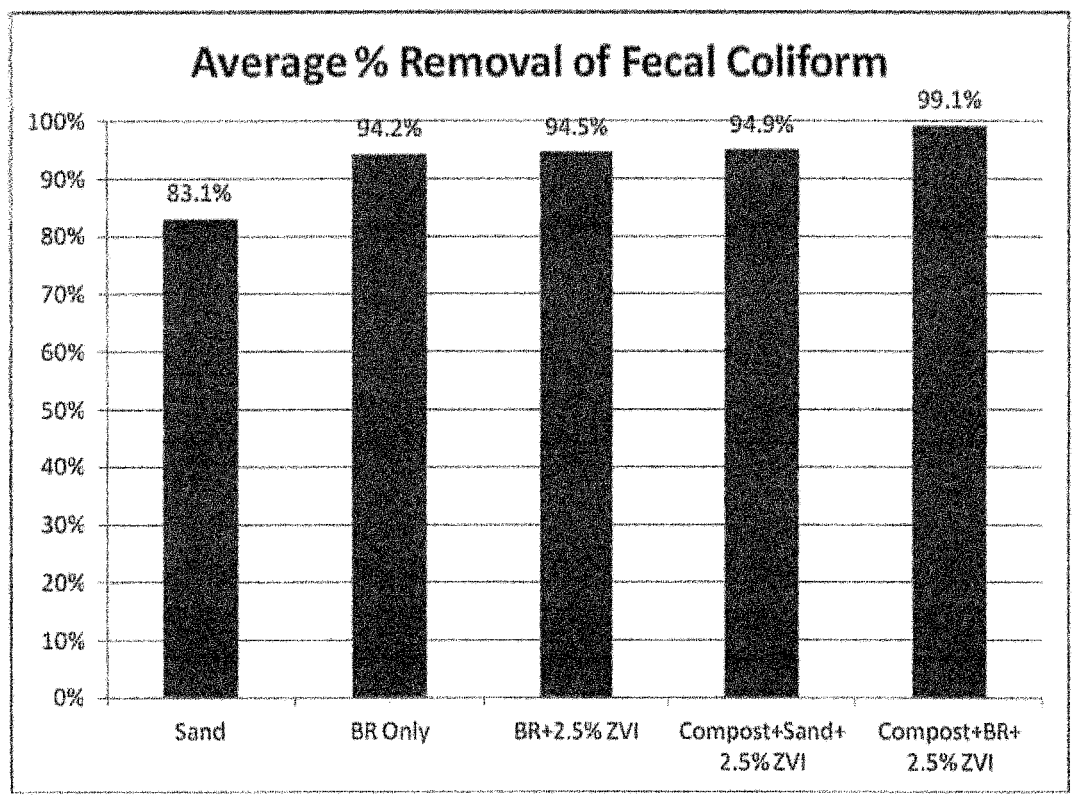
FIG. 15 depicts the average % removal of pathogens (as indicated by fecal coliform) for the different media columns of FIG. 12A. Sand had an average of 83.1% removal of pathogens; bauxite residue had an average of 94.2% removal of pathogens; bauxite residue and 2.5 wt. % zero valent iron had an average of 94.5% removal of pathogens; compost, followed by sand with 2.5 wt. % ZVI had an average of 94.9% removal of pathogens; and compost followed by bauxite residue having 2.5 wt. % ZVI had an average removal of 99.1% removal of pathogens.
Figure 16:
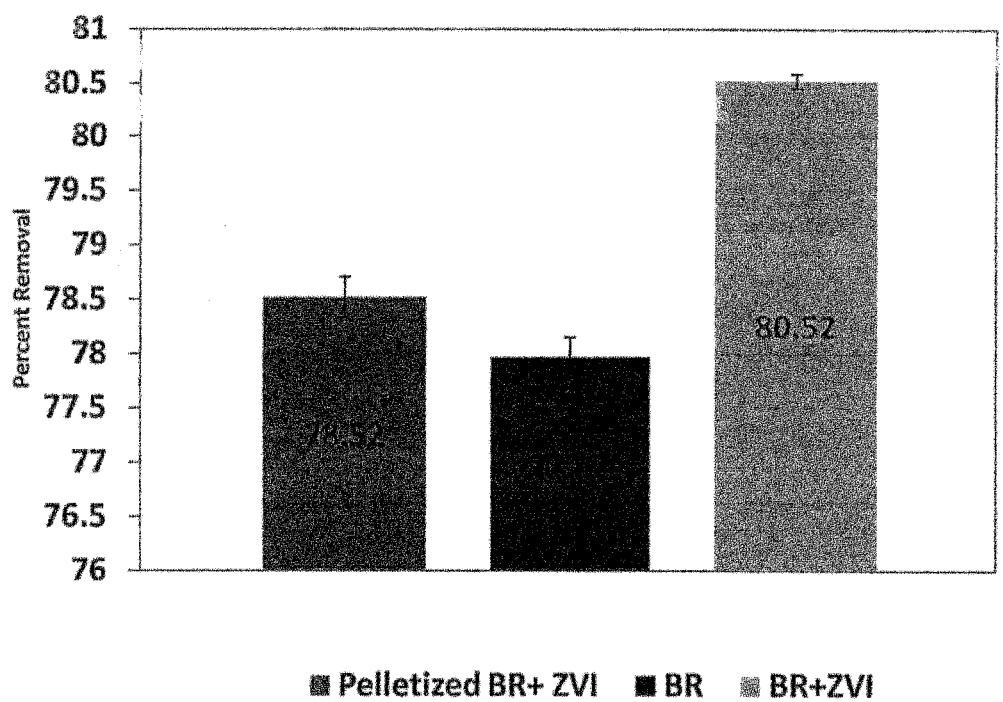
FIG. 16 depicts a graph of Pathogen Removal (indicated by Fecal Coliform Removal (%)) in three different columns, showing that the column having pelletized BR with 2.5 wt. % ZVI had 78.52% removal; the column having bauxite residue had 77.97% removal; and the column having bauxite residue and 2.5 wt. % ZVI had 80.52% removal.
Figure 17:
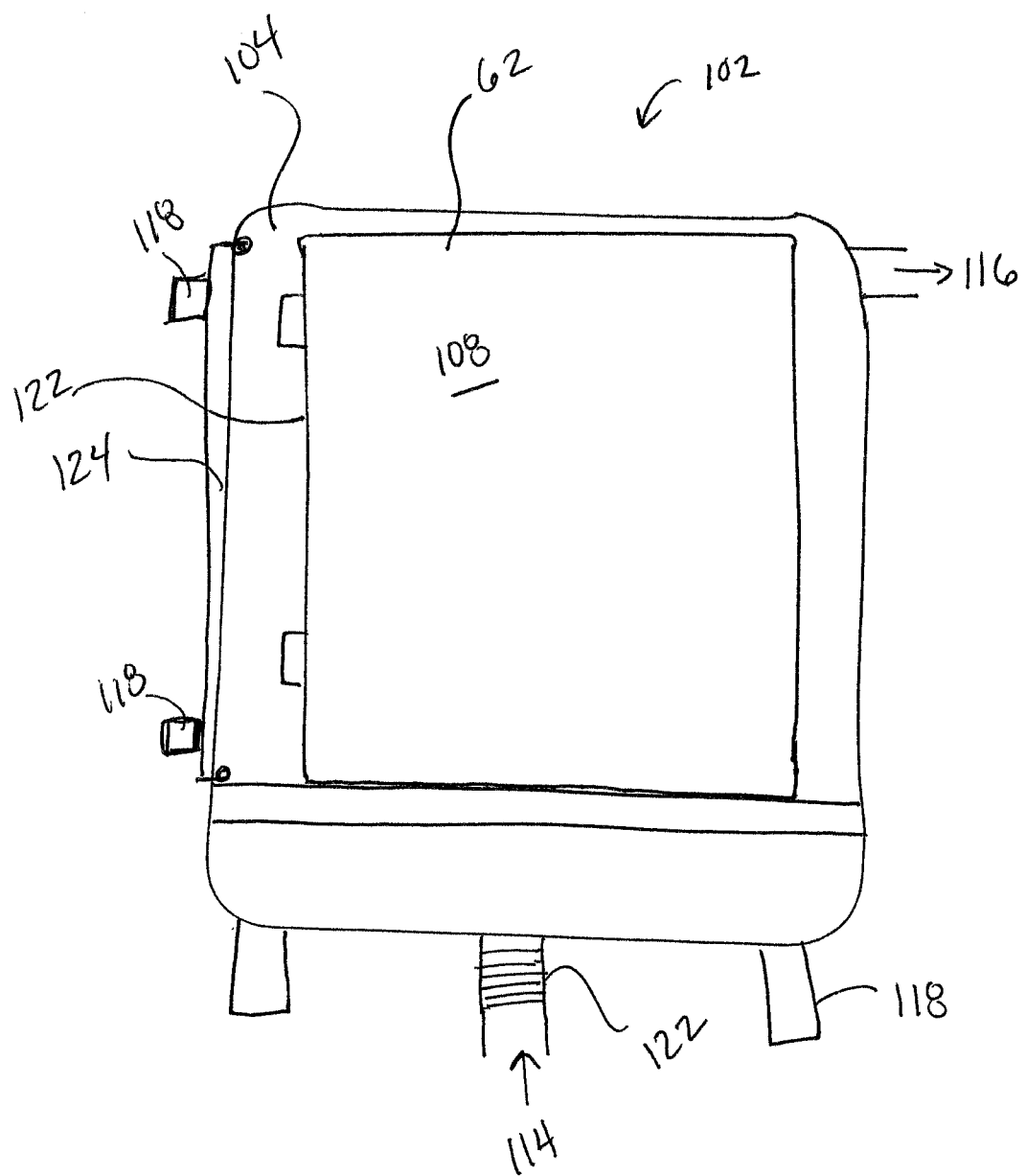
FIG. 17 depicts a schematic of a cut-away sideview of a bauxite residue module, in accordance with the instant disclosure.

FIG. 15 is a graph depicting the average percent removal of pathogens (e.g. indicated as fecal coliform) for the five different columns tested. For this data, influent and effluent FC concentrations were measured at each column and data from the first 6 weeks of monitoring was removed. Percent FC removal is measured as (CFU inf–CFU eff)/CFU inf. Outliers or unreliable data were considered any data points below two standard deviations below the mean and any data points below zero (indicating that the effluent FC concentration was higher than the influent). Data reported below the detection limit (<10 CFU/100 mL) were assumed to be 5, so average percentages did not skew high or low.

Like the average effluent concentration, the average percent removal shows that all treatment columns performed better than sand, and that the columns with the compost pretreatment step performed better than the columns without the additional residence time. The column with BR+2.5% ZVI performed slightly better than the BR only column, and the BR+2.5% ZVI column with compost pretreatment performed better than all other treatment columns.

Because it was believed that due to experimental error, reliable data for the influent concentration was not available for a large portion of the study, effluent FC concentration only was considered in the statistical analysis. In the BR/ZVI column tests, all treatment columns performed statistically significantly better than sand at a 90% confidence level; even after the 'startup period' during which the sand column developed its biological disinfection layer, all treatment columns performed statistically significantly better than sand at an 86% confidence level.

Without being bound to a particular mechanism or theory, filtration is still believed to play a role in disinfection in the bauxite residue cell. The data in the column experiments showed that BR removes FC more effectively than the simple granular filtration mechanism seen in sand. These results indicate that another mechanism in addition to granular filtration is at work in disinfection by BR.

EXAMPLE 3

Media Pelletizing Experiments

In order to pelletize the BR with 2.5 wt. % ZVI, the BR was first dried to remove the excess moisture content of the BR (e.g. 25-30% moisture content in as-received form). Once dried, the BR and ZVI were both ground into a powder (e.g. fine powder), completed via a cone mill (e.g. which ground and mixed the components). Once the media were ground and commingled, water was added to the mixture (e.g. to act as a binding agent). The media with binding agent was mixed in a Simpson mixer until the media formed into balls/pellets. The pelletized media was allowed to air dry. The average size of the pellets varied. $D_{25}$ was $\frac{3}{8}$". $D_{50}$ for the pelletized BR/ZVI material was 0.187 in (standard US mesh size 4).

In some embodiments, the pelletized media (BR and ZVI) is from about $\frac{1}{20}$ of an inch to about 3 inches.

EXAMPLE 4

Pelletized Vs. Non-Pelletized Media

Column experiments were carried out to compare pathogen removal (e.g. indicated via fecal coliform removal) of pelletized and unprocessed (non-pelletized) BR. Three columns were tested, and contained the following media: pelletized BR with 2.5 wt % ZVI, BR hand mixed with 2.5 wt % ZVI, and BR only. Each column had an HRT of 4 hours. The columns drew influent with an average fecal coliform concentration of 143 CFU/100 mL. The pelletized BR with 2.5 wt % ZVI began running 37 days before the BR only column began running and 101 days before the hand-mixed BR with 2.5 wt % ZVI; samples were collected from each column approximately weekly.

Influent and effluent samples were analyzed for fecal coliform concentration using Standard Method 9222D; samples were analyzed by Microbac, a certified outside lab. Data was analyzed for percent removal, $C_{inf}-C_{eff}/C_{inf}$. This data set included 9 or fewer samples per column. Results indicate that the pelletized BR with 2.5 wt % ZVI works about as well as the unprocessed (non-pelletized) BR.

EXAMPLE 5

Computational Flow Dynamics Modeling

Computational fluid dynamics (CFD) modeling of various baffle configurations was completed to understand the velocity profile of different configurations. Modeling was done on Ansys Fluent Software Version 13.0. Each model run assumed influent flow of 1 gallon per minute (gpm) plain water into one chamber plus half of another chamber, where the chamber is depicted as two-dimensional chambers (consisting of a 60" water depth, 6" wide downflow section, and 24" wide up flow section, and the 6" wide down flow section of the subsequent chamber). Each chamber includes: one down flow section (before hockey stick shaped baffle to direct flow of water down) and one up flow section (after hockey stick or 'suspended' baffle to direct the flow of water up).

Figure 18:
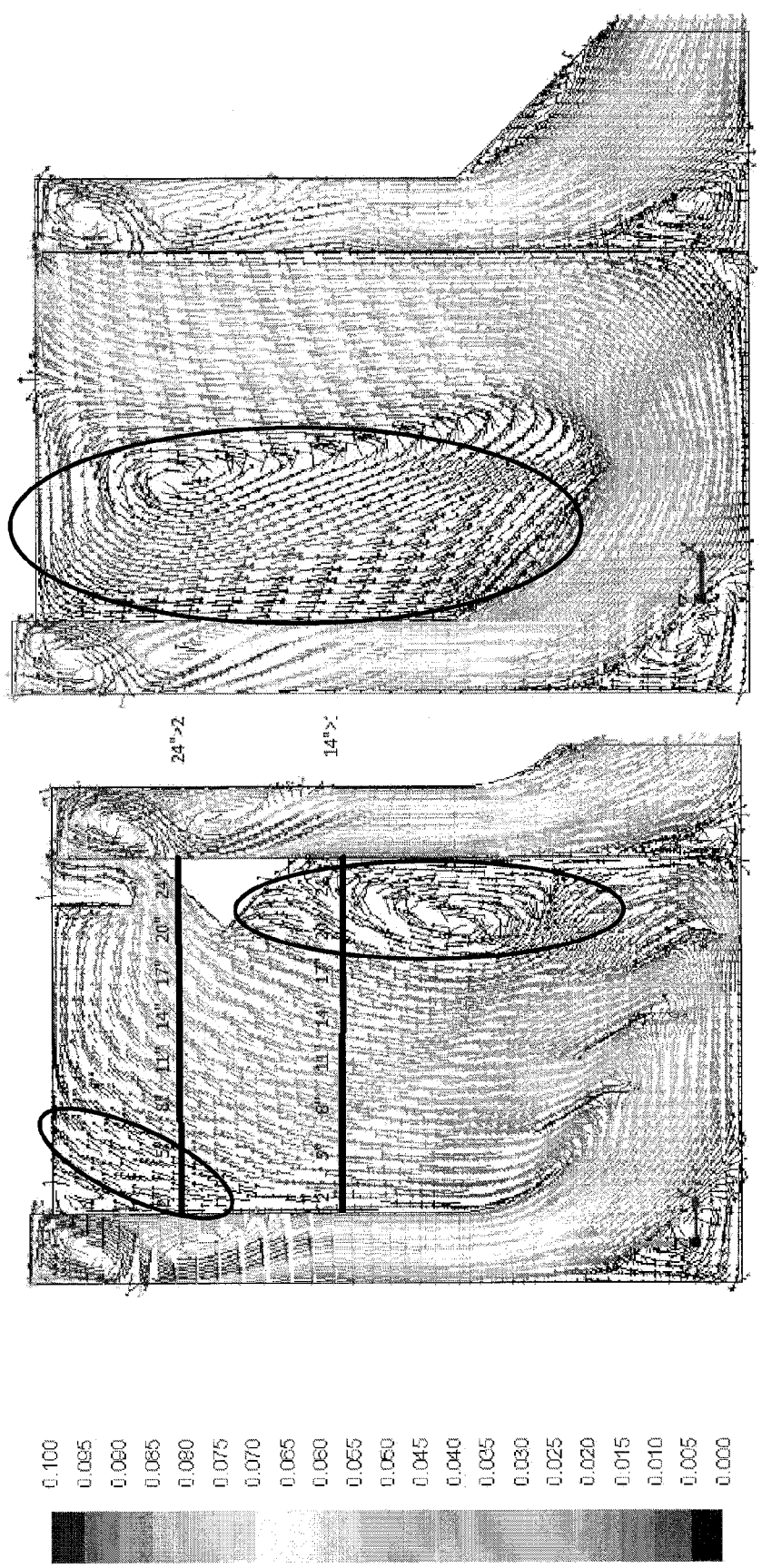
FIG. 18 depicts the computational flow dynamics of an anaerobic tank having a baffle configuration of the instant disclosure compared to a tank having conventional baffle configuration, where the dashed lines are representative of a velocity profile of water through the tanks, illustrative of the water movement through the tank and dead zones or static areas.

Referring to FIG. 18, the resulting models depicts a two-dimensional velocity vector profile between the baffles in the system, where the velocity profile is indicative of the water velocity through the chamber and displays "dead zones", or areas of slow velocity/no mixing, if any.

Referring to FIG. 18, the model on the left was of the baffle configuration depicted in FIG. 11 (e.g. hockey stick-shaped baffle and the three spaced members (e.g. vane baffles)), while the model on the right was of the conventional baffle design. The dead zones perceived through visual observation of the resulting CFD models are circled in each model in FIG. 18. In contrast with the conventional baffle configuration, the baffle configuration of the instant disclosure as a much smaller "dead zone" area. Without being bound by a particular mechanism or theory, it is believed that this may attribute to a higher degree of mixing, improved treatment as compared to the conventional system (e.g. promote solids retention, removal of inorganic solids, organic solids).

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method of treating wastewater, comprising;
    flowing a wastewater stream through at least one anaerobic settling and treatment tank, wherein the anaerobic settling and treatment tank comprises:
        a bottom and at least one sidewall,
        an influent end and an effluent end in liquid communication with a control volume in the tank, wherein the control volume is configured to retain the wastewater stream;
    wherein the tank further comprises a baffle configuration, including:
        a baffle located adjacent to the influent end and configured to distribute the flow of the wastewater stream into the tank; and
        at least one member configured between the baffle and the effluent end sidewall, wherein the member is configured to promote mixing and flow distribution of the wastewater stream, and
        a settling promoter configured along the effluent end sidewall and configured to promote settling of solids prior to discharge from the effluent end;
    wherein the baffle configuration is configured to flow the wastewater stream through the tank along at least one predetermined flow path at a surface overflow rate of at least 0.25 m/hr; and
    treating the wastewater in the anaerobic settling and treatment tank via the baffle configuration and surface overflow rate to remove at least 75% of organics from the wastewater stream to provide a low organics wastewater stream;
    flowing a low organics wastewater stream into an engineered wetland from the anaerobic settling treatment tank effluent, wherein the engineered wetland is in liquid communication with the anaerobic settling and treatment tank;
    aerating the low organics wastewater stream, wherein aerating the low organics wastewater stream is sufficient to sustain aerobic bacteria;
    treating the low organics wastewater stream in the engineered wetland to remove:
        ammonia from the low organics wastewater stream to a content of not greater than 8 ppm, wherein the engineered wetland stream comprises a pore water hydraulic retention time of not greater than 4 days;
    discharging a treated water stream from the engineered wetland.

2. The method of claim 1, wherein the settling promoter comprises an angle baffle configured to the sidewall proximate an effluent end.

3. The method of claim 1, wherein the settling promoter comprises a discontinuous region along the at least one sidewall proximate an effluent end.

4. The method of claim 1, wherein the anaerobic settling and treatment tank comprises a plurality of members spaced apart from one another, between the baffle and the settling promoter.

5. The method of claim 4, further comprising three members, spaced equidistant from each other and comprising an identical angled position within the tank, wherein the three members are located proximate to a lower end of the tank.

6. The method of claim 1, wherein aerating comprises aerating the low organics wastewater stream at a rate of at least 1.1 scfm/gpm wastewater.

7. The method of claim 6, wherein aerating is sufficient to sustain a dissolved oxygen content of at least about 80% of saturation of the low organics wastewater stream at a given temperature.

8. The method of claim 1, wherein the engineered wetland comprises a pore water hydraulic retention time of at least about 0.25 day.

9. The method of claim 1, further comprising, prior to the discharging step:
    flowing a low nitrogen wastewater stream from the engineered wetland to an inlet of at least one polishing cell having media including bauxite residue, where the cell is in liquid communication with the engineered wetland, wherein the polishing cell comprises at least one sidewall, an inlet and an outlet configured to encase the media within the cell, wherein the cell is configured to permit the low nitrogen wastewater stream to flow therethrough via the inlet and outlet, and
    treating the low nitrogen wastewater stream via the media to remove at least about 30% pathogens from the low nitrogen wastewater; and
    flowing a polished water stream from the effluent from the cell.

10. The method of claim 1, further wherein the method steps comprise a hydraulic retention time of at least 12 hours to not greater than 6 days.

11. A method comprising:
    analyzing a wastewater stream to determine a contaminant profile, the contaminant profile comprising: at least one contaminant;
    selecting a target cleaned water stream profile, wherein the cleaned water stream profile comprises upper limits of the quantities of contaminants present in the contaminant profile; and
    selecting, based on the target cleaned water stream profile and the contaminant profile of the wastewater stream, a number of tank modules, based on the contaminant profile;
    selecting, based on the target cleaned water stream profile and the contaminant profile of the wastewater stream, a number of engineered wetland modules, based on the contaminant profile;
    selecting, based on the target cleaned water stream profile and the contaminant profile of the wastewater stream, a number of bauxite residue modules, based on the contaminant profile;
    configuring a wastewater treatment system, where the system comprises a first zone having the number of tank modules, a second zone comprising the number of engineered wetland modules, and a third zone comprising the number of bauxite residue modules to define a wastewater flow path;

flowing the wastewater stream through the flow path defined by the first zone, the second zone, and the third zone of the system;

treating the wastewater stream via the system to remove contaminants via the first zone, the second zone, and the third zone; and discharging a cleaned water stream, wherein the cleaned water stream comprises a cleaned water stream profile which corresponds to the target cleaned water stream profile.

12. The method of claim 11, further comprising:
replacing at least one module of the tank modules, wetland modules, or bauxite residue modules after a predetermined amount of time.

13. The method of claim 12, further comprising:
replacing at least one module of the tank modules, wetland modules, or bauxite residue modules after a predetermined amount of wastewater has been treated.

14. The method of claim 12, further comprising monitoring at least one module in the wastewater treatment system to assess the effectiveness of the module.

15. The method of claim 12, further comprising moving at least one module via a transport device configured to the module to allow mobility of the module.

16. The method of claim 15, wherein the transport device is selected from the group consisting of wheels, a track and wheels, a plurality of rollers, a conveyor belt, and combinations thereof.

17. The method of claim 11, connecting the number of modules in the system via connection ports as the inlet and outlet.

18. A method of treating wastewater, comprising:
flowing a wastewater stream through at least one anaerobic settling and treatment tank, wherein the anaerobic settling and treatment tank comprises:
a bottom and at least one sidewall,
an influent end and an effluent end in liquid communication with a control volume in the tank, wherein the control volume is configured to retain the wastewater stream;
wherein the tank further comprises a baffle configuration, including:
a baffle located adjacent to the influent end and configured to distribute the flow of the wastewater stream into the tank; and
at least one member configured between the baffle and the effluent end wall, wherein the member configured to promote mixing and flow distribution of the wastewater stream, and
a settling promoter configured along the effluent end sidewall and configured to promote settling of solids prior to discharge from the effluent end;
wherein the baffle configuration is configured to flow the wastewater stream through the tank along at least one predetermined flow path at a surface overflow rate of at least 0.25 m/hr; and
treating the wastewater stream in the anaerobic settling and treatment tank via the baffle configuration and surface overflow rate to remove at least 75% of organics from the wastewater stream to provide a low organics wastewater stream;
flowing a low organics wastewater stream into an engineered wetland from the anaerobic settling and treatment tank effluent, wherein the engineered wetland is in liquid communication with the anaerobic settling and treatment tank;
aerating the low organics wastewater stream, wherein aerating the low organics wastewater stream is sufficient to sustain aerobic bacteria;
treating the low organics wastewater stream in the engineered wetland to remove ammonia from the low organics wastewater stream to a content of not greater than 8 ppm to provide a low nitrogen wastewater stream, wherein the engineered wetland comprises a pore water hydraulic retention time of not greater than 4 days;
flowing the low nitrogen wastewater stream from the engineered wetland to an inlet of at least one polishing cell having media including bauxite residue, where the cell is in liquid communication with the engineered wetland, wherein the polishing cell comprises at least one sidewall, an inlet and an outlet configured to encase the media within the cell, wherein the cell is configured to permit the low nitrogen wastewater stream to flow therethrough via the inlet and outlet, and
treating the low nitrogen wastewater stream via the via the media to remove at least about 30% pathogens from the low nitrogen wastewater stream; and
discharging a treated water stream from the engineered wetland.

19. The method of claim 18, further wherein the method steps comprise a hydraulic retention time of at least 12.5 hours to not greater than 6.5 days.

* * * * *